US010999318B2

(12) United States Patent
Levine et al.

(10) Patent No.: US 10,999,318 B2
(45) Date of Patent: May 4, 2021

(54) ALGORITHMIC PACKET-BASED DEFENSE AGAINST DISTRIBUTED DENIAL OF SERVICE

(71) Applicant: Uniken, Inc., Chatham Township, NJ (US)

(72) Inventors: Robert Alan Levine, San Diego, CA (US); Nishant Kaushik, Jersey City, NJ (US); Bimal I. Gandhi, Chatham, NJ (US)

(73) Assignee: UNIKEN INC., Chatham, NJ (US)

( * ) Notice: Subject to any disclaimer, the term of this patent is extended or adjusted under 35 U.S.C. 154(b) by 230 days.

(21) Appl. No.: 16/028,278

(22) Filed: Jul. 5, 2018

(65) Prior Publication Data

US 2019/0014145 A1 Jan. 10, 2019

Related U.S. Application Data

(60) Provisional application No. 62/530,097, filed on Jul. 7, 2017.

(51) Int. Cl.
*H04L 29/06* (2006.01)

(52) U.S. Cl.
CPC ...... *H04L 63/1458* (2013.01); *H04L 63/0227* (2013.01); *H04L 63/0869* (2013.01); *H04L 63/126* (2013.01); *H04L 63/1416* (2013.01); *H04L 63/1425* (2013.01); *H04L 69/22* (2013.01)

(58) Field of Classification Search
CPC .............. H04L 63/1458; H04L 63/0869; H04L 63/126; H04L 63/1425; H04L 69/22; H04L 63/0227; H04L 63/1416; H04L 29/06; H04L 29/12; H04L 9/32; H04L 63/0435; H04L 67/2814
USPC .......................................................... 726/23
See application file for complete search history.

(56) References Cited

U.S. PATENT DOCUMENTS

| 5,600,722 | A  | * | 2/1997 | Yamaguchi | ............... | H04L 9/12 380/281 |
| 2008/0052509 | A1 | * | 2/2008 | Ahmed | .................. | H04L 63/02 713/156 |
| 2014/0164776 | A1 | * | 6/2014 | Hook | .................. | G06F 21/6218 713/171 |
| 2017/0063797 | A1 | * | 3/2017 | Jain | ..................... | H04L 41/5045 |
| 2017/0171170 | A1 | * | 6/2017 | Sun | ..................... | H04L 67/2814 |
| 2018/0198761 | A1 | * | 7/2018 | Naylor | ................ | H04L 63/0281 |

* cited by examiner

*Primary Examiner* — Abu S Sholeman
(74) *Attorney, Agent, or Firm* — Loza & Loza, LLP; Michael J. Phipps

(57) ABSTRACT

A middlebox includes at least one processor and a memory storing one or more executable instructions that, when executed by the least one processor, cause the at least one processor to receive, from a server, a middlebox key that includes an indication of a lifetime of the middlebox key, receive, from a client device, one or more data packets including encrypted header data and a client device identifier, and determine whether to permit a transmission of the one or more data packets to the server or prevent a transmission of the one or more data packets to the server based on the middlebox key, the encrypted header data, and the client device identifier.

15 Claims, 13 Drawing Sheets

ALGORITHMIC PACKET-BASED DEFENSE AGAINST DISTRIBUTED DENIAL OF SERVICE

CROSS-REFERENCE TO RELATED APPLICATION AND PRIORITY CLAIM

This application claims priority under 35 U.S.C. § 119(e) to U.S. Provisional Patent Application No. 62/530,097 filed on Jul. 7, 2017 and entitled "ALGORITHMIC PACKET-BASED DEFENSE AGAINST DISTRIBUTED DENIAL OF SERVICE," the contents of which is hereby incorporated by reference in its entirety.

TECHNICAL FIELD

The present disclosure is related to methods for reducing cyber-attacks. More specifically, this disclosure is related to methods for reducing distributed denial of service (DDOS) attacks.

BACKGROUND

DDOS attacks are cyber-attacks in which an attacker fills all (or nearly all) of a bandwidth of a victim's server, website, or other networked computing device with packet traffic from many different internet protocol (IP) addresses. During a DDOS attack, the flood of traffic from the IP addresses prevents the victim's server, website, or networked computing device from being accessible to legitimate traffic. Since the DDOS attack includes traffic from many different IP addresses, it is difficult to for the victim's server, website, or networked computing device to distinguish between legitimate user traffic and attacking user traffic, identify a source of the attack or block incoming traffic from suspicious IP addresses. Since DDOS attacks block all (or nearly all) of the bandwidth of the victim's server, website, or other networked computing device, it is important to defend against a DDOS attack.

SUMMARY

This disclosure provides apparatus and methods for reducing distributed denial of service (DDOS) attacks.

In a first embodiment, a middlebox is provided. The middlebox includes at least one processor. The middlebox also includes a memory storing one or more executable instructions. The one or more executable instructions, when executed by the least one processor, cause the at least one processor to receive, from a server, a middlebox key that includes an indication of a lifetime of the middlebox key. The one or more executable instructions, when executed by the least one processor, also cause the at least one processor to receive, from a client device, one or more data packets including encrypted header data and a client device identifier. The one or more executable instructions, when executed by the least one processor, further cause the at least one processor to determine whether to permit a transmission of the one or more data packets to the server or prevent a transmission of the one or more data packets to the server based on the middlebox key, the encrypted header data, and the client device identifier.

In a second embodiment, a method implemented by at least one processor of a middlebox is provided. The method includes receiving, by the at least one processor and from a server, a middlebox key that includes an indication of a lifetime of the middlebox key. The method also includes receiving, by the at least one processor and from a client device, one or more data packets including encrypted header data and a client device identifier. The method further includes determining, by the at least one processor, whether to permit a transmission of the one or more data packets to the server or prevent a transmission of the one or more data packets to the server based on the middlebox key, the encrypted header data, and the client device identifier.

In a third embodiment, a server is provided. The server includes at least one processor. The server also includes a memory storing one or more executable instructions. The one or more executable instructions, when executed by the least one processor, cause the at least one processor to generate an encryption key and a middlebox key, wherein the middlebox key includes an indication of a lifetime of the middlebox key. The one or more executable instructions, when executed by the least one processor, also cause the at least one processor to transmit the middlebox key including the indication to a middlebox. The one or more executable instructions, when executed by the least one processor, further cause the at least one processor to transmit the encryption key, the middlebox key, and the indication to a client device. In addition, the one or more executable instructions, when executed by the least one processor, cause the at least one processor to receive one or more data packets from the client device when the one or more data packets include encrypted header data that is encrypted using the middlebox key.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
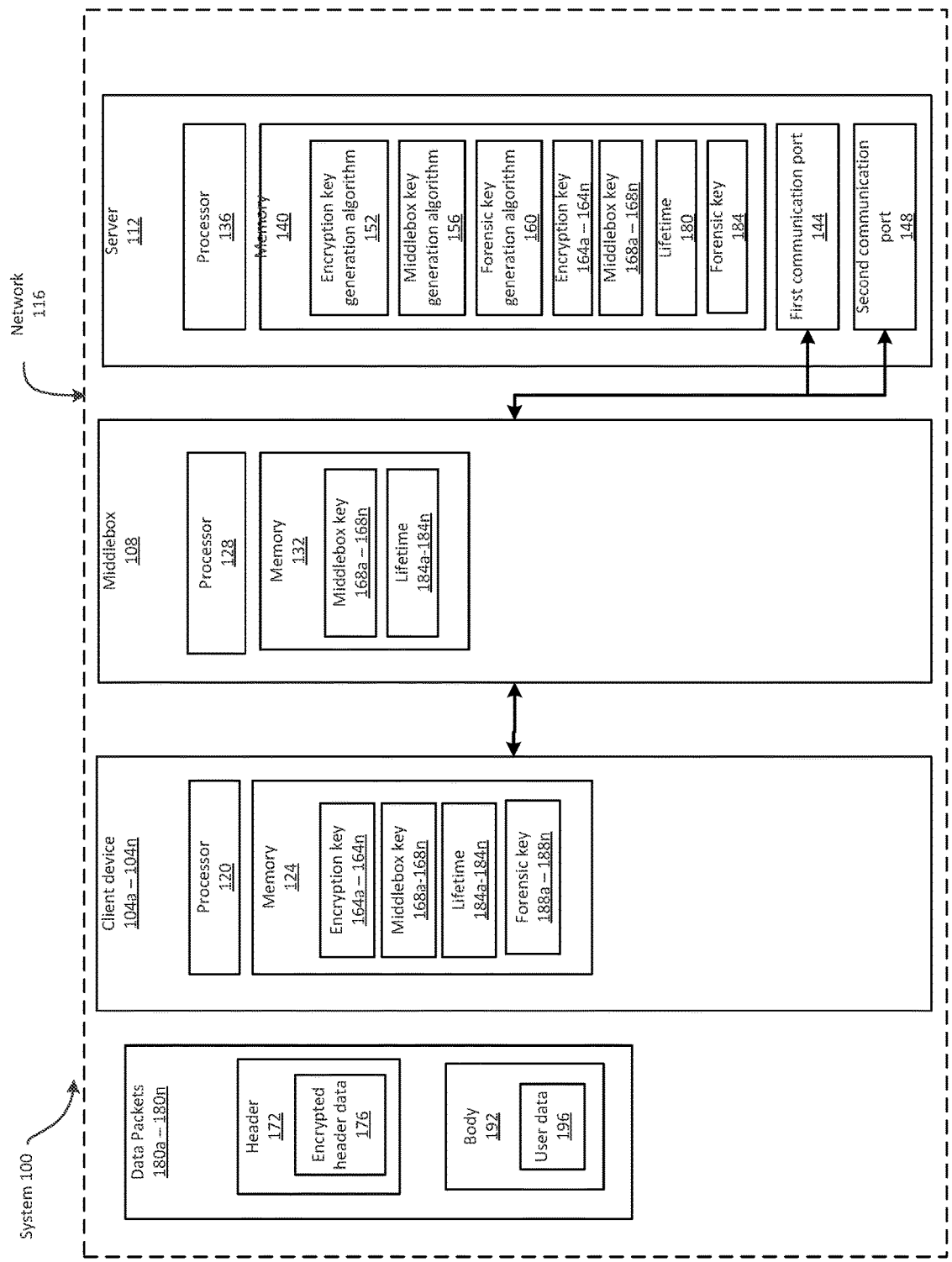
FIG. 1 illustrates an example system according to certain embodiments of this disclosure.

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic communication system.

DDOS attacks are cyber-attacks in which an attacker fills all (or nearly all) of a bandwidth of a victim's server, website, or other networked computing device with packet traffic from many different internet protocol (IP) addresses. During a DDOS attack, the flood of traffic from the IP addresses prevents the victim's server, website, or networked computing device from being accessible to legitimate traffic. Some DDOS attacks may occur on the network-layer when the attacker overwhelms targeted networking resources with a flood of data packets. Some DDOS attacks may occur on the application-layer when the attacker overwhelms application services or databases with a high volume of application calls.

The attacker may hijack many networked devices having different IP addresses and use the hijacked networked devices to overwhelm the victim with data packet traffic. Since the DDOS attack includes traffic from many different IP addresses, it is difficult for the victim's server, website, or networked computing device to distinguish between legitimate user traffic and attacking user traffic, identify a source of the attack or block incoming traffic from suspicious IP addresses. Since DDOS attacks block all (or nearly all) of the bandwidth of the victim's server, website, or other networked computing device, it is important to defend against a DDOS attack upstream of a server, website, or other networked computing device.

In some networked communication protocols, communication from a client device to a server, website, or other networked device may first travel through a middlebox. The term "middlebox" is generally used to refer to a networked computing device that may analyze, inspect, filter, or manipulate packet traffic for purposes other than packet forwarding. In some exemplary embodiments, the middlebox may be a firewall or a router. The middlebox may be used to block DDOS attacks. Middleboxes adapted to block DDOS attacks may use volumetric algorithms, heuristic algorithms, protocol breaks, or the like. An exemplary volumetric algorithm may block all traffic exceeding a predetermined volume from an IP address. An exemplary heuristic algorithm may analyze incoming packets and block unexpected/abnormal packets (e.g. a packet originating from a known IP address but an abnormal geographic location). An exemplary protocol break may analyze traffic and block atypical traffic.

In certain embodiments, the disclosure provides a system including a server that may have a processor, a memory including a middlebox encryption key generation algorithm executable by the processor to generate a middlebox key, a first communication channel for receiving at least one data packets including header data encrypted using the middlebox key, and a second communication channel. The system further includes a middlebox that may have a processor and a memory. The middlebox is in communication with the server over a network (e.g., a wired or wireless communication network). The middlebox is configured to receive the middlebox encryption key from the server and store the middlebox encryption key in the memory. The middlebox is configured to receive at least one data packets sent over the network. The memory of the middlebox includes program instructions operable by the processor of the middlebox to analyze headers of the at least one data packets and direct the at least one data packets including headers having header data encrypted with the middlebox encryption key to the first communication channel.

In another embodiment, the disclosure provides a middlebox in communication with a computing device over a server and adapted to receive at least one data packets including a header sent over the server. The middlebox includes a processor and a memory. The middlebox is configured to receive a first middlebox key having a first lifetime from the server and store the first middlebox key and the first lifetime to the memory. The memory includes program instructions operable by the processor to analyze the header of the at least one data packets and direct the at least one data packets including header data encrypted using the first middlebox encryption key to the first communication channel during the first lifetime, direct at least a portion of the at least one data packets that does not include header data encrypted using the middlebox key to the second communication channel, and block at least a portion of the at least one data packets that does not include header data encrypted using the middlebox key from the second communication channel.

In another embodiment, the disclosure provides a computer-implemented method including the step of forming using a computing device at least one data packets including a header and encrypting at least a portion of data stored in the header with a middlebox key to form encrypted header data. The computer-implemented method further includes the step of sending the at least one data packets to a server over a network. The computer-implemented method further includes the step of receiving, with a middlebox, the at least one data packets, and identifying the encrypted header data. Responsive to identifying the encrypted header data, the computer-implemented method further includes the step of sending, with the middlebox, the at least one data packets to a first communication channel of the server.

FIG. 1 illustrates a system 100 including a client computing device 104, a middlebox 108, and a server 112 in electronic communication over a network 116. The client computing device 104 includes a processor 120 and a memory 124. The client computing device 104 may be a personal computing device of an user, such as a laptop or desktop computer, a tablet, a smartphone, a gaming console, or any other device capable of communicating over the network 116. In some embodiments, multiple client computing devices 104a-104n may be in communication with the middlebox 108 or the server 112 over the network 116. Each of the client computing devices 104a-104n may be autonomously administered by different entities (e.g., different users or different companies) and may or may not share content or interact with each other. Each client computing device 104 may have the same users, different users, or different sets of users. The middlebox 108 includes a processor 128 and a memory 132.

The system 100 may belong to a service provider, such as a bank or a merchant, that conducts services for the client. The server 112 includes a processor 136, a memory 140, a first communication channel 144, and a second communication channel 148. The memory 140 includes an encryption key generation algorithm 152, a middlebox encryption key generation algorithm 156, and a forensic key generation algorithm 160. The encryption key generation algorithm 152 includes instructions executable by the processor 136 to form an encryption key 164 for encrypting user data 196 sent between the client computing device 104 and the server 112 using the packets 180a-180n. The middlebox encryption key generation algorithm 156 includes instructions executable by the processor 136 to generate middlebox keys 168a-168n for encrypting data stored in a header 172 of each of the packets 180a-180n. The middlebox encryption key generation algorithm 156 is executable by the processor 136 to generate a lifetime 184 for each middlebox key 168. In some embodiments, the lifetime 184 is a finite lifetime and may be days, weeks, or months. The forensic key generation algorithm 160 includes instructions executable by the processor 136 for generating a forensic key 188 usable to identify a client computing device 104 used in a DDOS attack.

With continued reference to FIG. 1, both the first communication channel 144 and the second communication channel 148 are in electronic communication with the middlebox 108. The first communication channel 144 is separate from the second communication channel 148. The first communication channel 144 is configured to receive packets 180a-180n having a header 172 that does not include header data 176 encrypted using a valid middlebox key 168. The second communication channel 148 is configured to receive packets 180a-180n that each includes a header 172 that has header data 176 that has been encrypted using the valid middlebox key 168a-168n. Since the data packets 180a-180n that are encrypted using the valid middlebox key 168a-168n are sent to the second communication channel 148, the likelihood that a DDOS attack can successfully overwhelm legitimate packet communication through the second communication channel 148 is greatly reduced.

The client computing device 104 (e.g., a client device 104) and the server 112 communicate by sending the packets 180a-180n over the network 116. In some embodiments, the client computing device 104, the middlebox 108, and the server 112 communicate using a packet-based byte-stream communication protocol such as a TCP protocol. More specifically, the client computing device 104, the middlebox 108, and the server 112 may communicate using a User Datagram Protocol (UDP)-based byte stream protocol such as Quick UDP Internet Connection (QUIC). The term "packet" or "data packet" is generally used herein to refer to a formatted unit of data sent over the internet. The packets may include the header 172 and a body 192. The header 172 may include the encrypted header data 176 and the forensic key 188. The body 192 may include the user data 196. The encrypted header data 176 may include a source IP address, a destination IP address, and/or or other types of data. In the illustrated construction, the header 172 may be modified by the client computing device 104 or the server 112. The middlebox 108 reads the header 172 to determine whether to allow the packets 180a-180n to pass through the middlebox 108 to the server 112 or whether to block the packets 180a-180n from reaching the server 112.

The middlebox key 164 and the lifetime 184 are stored in the memory 124 of the client computing device 104, the memory 132 of the middlebox 108, and the memory 140 of the server 112. The encrypted header data 176 may be encrypted using the middlebox key 168. The encrypted header data 176 may include a source IP address, a destination IP address, a time stamp, a randomizer, and a hash. In the illustrated embodiment, the middlebox key 168 is a symmetric key. The term "symmetric key" is generally used herein to refer to a key that is used to both encrypt and decrypt data. In other embodiments, the middlebox key 168 may be an asymmetric key.

The header 172 may include a forensic key 188. The data encrypted using the forensic key 188 may include the source IP address, the destination IP address, the time stamp, a client device ID, a nonce, and a hash. In some embodiments, the client computing device 104 and the server 112 may have a pre-established relationship, as described herein. In such embodiments, the encryption key 164 that is unique to the pre-established relationship between the client computing device 104 and the server 112.

The user data 196 includes the information sent between the client computing device 104 and the server 112. In the illustrated embodiment, the packets 180*a*-180*n* sent between the client computing device 104 and the server 112 pass through the middlebox 108 before reaching the server 112 (e.g. the middlebox 108 is upstream of the server 112). The user data 196 is encrypted using the encryption key 164. In the illustrated embodiment, the encryption key 164 is an asymmetric key. The term "asymmetric key" is generally used herein to refer to a key that is either used to encrypt data or used to decrypt data.

The middlebox 108 may include at least one processor 128 and at least one memory 132. The middlebox 108, utilizing the at least one processor 128, may establish communication with the server 112 and requests a middlebox key 168 that includes the indication of the lifetime 184 of the middlebox key 168. The middlebox 108, utilizing the at least one processor 128, may receive from the server 112 a middlebox key 168 that includes an indication of a lifetime (e.g., a lifetime 184) of the middlebox key 168. The middlebox key 168 may be stored in a middlebox key portion of the memory 132 containing one or more middlebox keys 168*a*-168*n*. The indication of the lifetime may be stored in a lifetime portion of the memory 132 containing one or more indications of lifetimes (e.g., lifetimes) that are each associated with a middlebox key 168 stored in the middlebox key portion of the memory 132.

The middlebox 108, utilizing the at least one processor 128, may receive, from the client device 104, one or more data packets 180 including a header 176 and body 192. The header 176 may include encrypted header data 176. The body 192 may include user data 196. In certain embodiments, the user data 196 may include a client device identifier.

The middlebox 108, utilizing the at least one processor 128, may determine whether to permit a transmission of the one or more data packets 180 to the server 112 or prevent a transmission of the one or more data packets 180 to the server 112 based on the middlebox key 168, the encrypted header data 176, and the client device identifier. For example, the middlebox 108, utilizing the at least one processor 128, may prevent the transmission of the one or more data packets 180 to the server 112 after determining that encrypted header data 176 in the header 172 was encrypted using the middlebox key 168 and after determining that the encrypted header data 176, after decryption, does not match the client device identifier. In certain embodiments, the middlebox 108 may save (or generate and save) a record of the one or more data packets 108.

As another example, the middlebox 108, utilizing the at least one processor 128, may prevent the transmission the one or more data packets 180 to the server 112 after determining that the encrypted header data 176 was not encrypted using the middlebox key 168 (or when the header 172 does not include encrypted header data 176) and after determining that the one or more data packets 180 are indicative of a distributed denial of service (DDOS) attack. In certain embodiments, the middlebox 108, utilizing the at least one processor 128, may determine that the one or more data packets 180 are indicative of a DDOS attack based on one or more of a volumetric algorithm, a heuristic algorithm, or a protocol break. When the one or more data packets 180 are indicative of a DDOS attack and after determining to prevent the transmission of the one or more data packets 180 to the server 112, the middlebox 108, utilizing the at least one processor 128, may retrieve the forensic key 160 from the encrypted header data 176 of the one or more data packets 180. The middlebox 108, utilizing the at least one processor 128, may analyze the forensic key 160 from the encrypted header data 176 of the one or more data packets 180 to determine which client devices 104 sent the one or more data packets 180.

As yet another example, the middlebox 108, utilizing the at least one processor 128, may permit the transmission of the one or more data packets 180 to the server 112 after determining that the encrypted header data was encrypted using the middlebox key and after determining that the encrypted header data, after decryption, does match the client device identifier. In certain embodiments, the middlebox 108 may permit or direct the transmission of or may transmit the one or more data packets 180 to the server 112 via the second communication port 148 of the server 112. The server 112 may decrypt the user data 196 of the one or more data packets 180 sent through the second communication port 148 using the encryption key 164 and may initiate downstream processes using the user data 196 contained in the one or more data packets 180.

As another example, the middlebox 108, utilizing the at least one processor 128, may permit the transmission of the one or more data packets to the server after determining that the encrypted header data was not encrypted using the middlebox key 168 and after determining that the one or more data packets are not indicative of a distributed denial of service (DDOS) attack. In certain embodiments, the middlebox 108 may permit or direct the transmission of or may transmit the one or more data packets 180 to the server 112 via the first communication port 144 of the server 112. The server 112 may send or transmit the encryption key 164, the middlebox key 168, the indication of the lifetime 184, and the forensic key 160 to the client device 104 using, for example, the first communication port 144. In certain embodiments, the server and the middlebox communicate using a User Datagram Protocol (UDP)-based byte stream protocol. For example, the UDP-based byte stream protocol comprises Quick UDP Internet Connection (QUIC).

In certain embodiments, the middlebox key may be a first middlebox key and the indication may be a first indication of the lifetime of the first middlebox key. In at least this case, the middlebox 108, utilizing the at least one processor 128, may receive, from the server 112, a second middlebox 168 key that includes a second indication of a lifetime 184 of the second middlebox key 168 before the lifetime of the first indication 184 reaches an expiration time. The middlebox 108, utilizing the at least one processor 128, may determine whether to permit a transmission of the one or more data packets 180 to the server 112 or to prevent a transmission of the one or more data packets 180 to the server 112 based on the second middlebox key 168, the encrypted header data 176, and the client device identifier. In response to determining whether to permit a transmission of the one or more data packets 180 to the server 112 or to prevent a transmission of the one or more data packets 180 to the server 112, the middlebox 108, utilizing the at least one processor 128, permit the transmission of the one or more data packets 180 to the server 112 during the lifetime of the second indication 184 or prevent the transmission of the one or more data packets 180 to the server 112 during the lifetime of the second indication 184.

The server 112 may include at least one processor 136, at least one memory 140, a first communication channel or port 144, and a second communication channel or port 148. The memory 140 may include a computer-executable encryption key generation algorithm 152, that when executed by the at least one processor 136, may cause the at least one processor 136 to generate an encrypted key 164. The memory 140 may also include a computer-executable middlebox key generation algorithm 156, that when executed by the at least one processor 136, may cause the at least one processor 136 to generate a middlebox key 168. In certain embodiments, the computer-executable middlebox key generation algorithm 156, when executed by the at least one processor 136, may cause the at least one processor 136 to generate an indication of a lifetime 184 for each generated middlebox key 168. The memory 140 may further include a forensic key generation algorithm 160, that when executed by the at least one processor 136, may cause the at least one processor 136 to generate a forensic key 184. The server 112 may also include a first communication channel or port 144 and a second communication channel or port 148 that are configured to transmit and receive data and data packets for storage in the memory 140 or for processing by the at least one processor 136.

The server 112, utilizing the at least one processor 136, may generate an encryption key 164 and a middlebox key 168. The middlebox key 164 includes an indication of a lifetime 184 of the middlebox key 168. The server 112 may also determine that communication has been established with the middlebox 108. The server 112, utilizing the at least one processor 136, may also transmit the middlebox key 168 including the indication of the lifetime 184 of the middlebox key 168 to the client device 104, for example, after (e.g., in response to) receiving a request from the client device 104 for the middlebox key 168 including the indication of the lifetime 184. In certain embodiments, the client device 104 may establish communication with the server 112 through the first communication port 144 of the server 112.

The server 112, utilizing the at least one processor 136, may transmit the encryption key 164, the middlebox key 168 including the indication of the lifetime 180, and the forensic key 184 to the client device 104. In certain embodiments, the server 112, may transmit the encryption key 164, the middlebox key 168 including the indication of the lifetime 180, and the forensic key 184 through the first communication port 144 to the client device 104. The server 112 may transmit the encryption key 164, the middlebox key 168 including the indication of the lifetime 180, and the forensic key 184 to the client device 104 so that the client device 104 may form one or more data packets 180 including encrypted user data 196, the encrypted header data 176, and the forensic key 184 to transmit or send to the server 112.

In certain embodiments, after the client device 104 transmits or sends one or more data packets 180 including encrypted user data 196, the encrypted header data 176, and the forensic key 184 to the server 112, the server 112, utilizing the at least one processor 136, may decrypt the user data 196 of the one or more data packets 180 from the client device 104 using the encryption key 164 after the middlebox 108, utilizing the at least one processor 128, permits the transmission of the one or more data packets 180 to the server 112 after determining that the encrypted header data was encrypted using the middlebox key and after determining that the encrypted header data, after decryption, does match the client device identifier. In this case, the server 112, utilizing the one or more processors 136 may initiate one or more downstream processes using the user data contained in the one or more data packets 180.

In certain embodiments, after the client device 104 transmits or sends one or more data packets 180 including encrypted user data 196, the encrypted header data 176, and the forensic key 184, the server 112, utilizing the at least one processor 136, receives the one or more data packets 180 from the client device 104, for example, through the first communication port 144 after the middlebox 108, utilizing the at least one processor 128, permits the transmission of the one or more data packets 180 to the server 112 after determining that the encrypted header data was not encrypted using the middlebox key 168 and after determining that the one or more data packets are not indicative of a distributed denial of service (DDOS) attack. The server 112 may send or transmit the encryption key 164, the middlebox key 168, the indication of the lifetime 184, and the forensic key 160 to the client device 104 using, for example, the first communication port 144. In certain embodiments, the server and the middlebox communicate using a User Datagram Protocol (UDP)-based byte stream protocol. For example, the UDP-based byte stream protocol comprises Quick UDP Internet Connection (QUIC).

Figure 2:
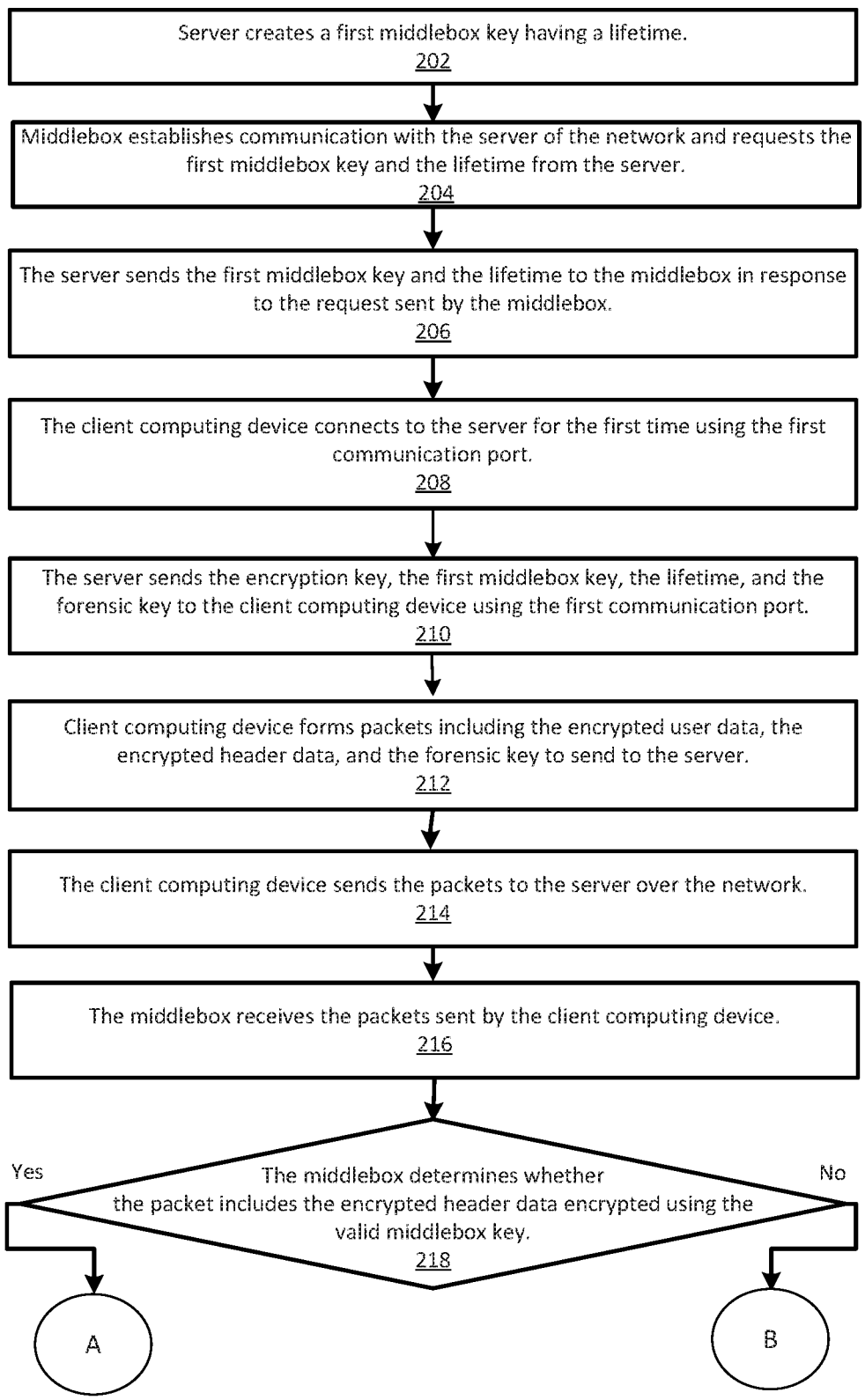
FIG. 2 illustrates an example method using a middlebox for establishing an authenticated stream of packet-based communication between the client computing device and the server according to certain embodiments of this disclosure.
Figure 2:
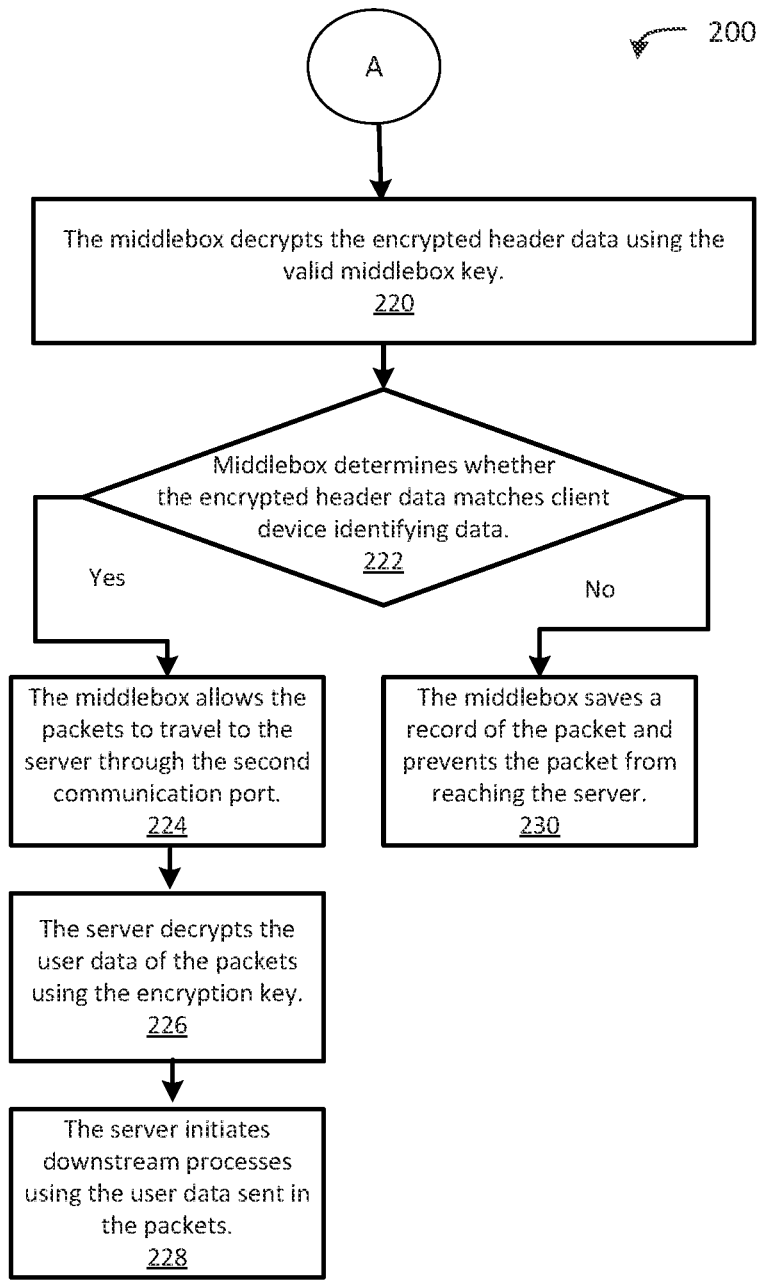
Figure 2:
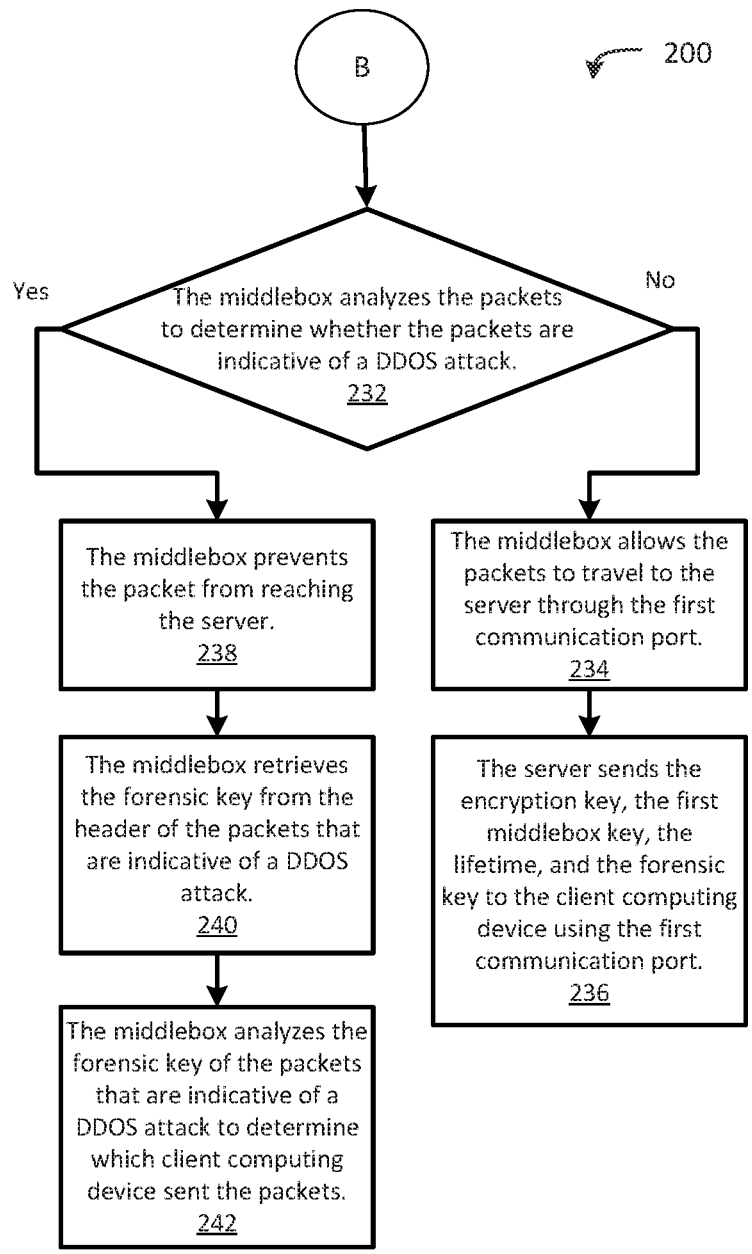

FIG. 2 illustrates an example method 200 using a middlebox 108 for establishing an authenticated stream of packet-based communication between the client computing device 104 and the server 112 according to certain embodiments of this disclosure. At step 202, the server 112 creates a first middlebox key 168 having a lifetime 184. At step 204, the middlebox 108 then establishes communication with the server 112 over the network 116 and requests the first middlebox key 168 and the lifetime 184 from the server 112. At step 206, in response to the request sent by the middlebox 108, the server 112 sends the first middlebox key 168 and the lifetime 184 to the middlebox 108. If the first middlebox key 168 is near the end of the lifetime 184, the server 112 may also send a second middlebox 108 key having another lifetime 184 to the middlebox 108. In other embodiments, the server 112 may detect the middlebox 108 over the network 116 and send the first middlebox key 168 and the lifetime 184 to the middebox 108. At step 208, the client computing device 104 connects to the sever 112 for the first time using the first communication channel 144. At step 210, the server 112 then sends the encryption key 164, the first middlebox key 168a, the lifetime 184, and the forensic key 188 to the client computing device 104 using the first communication channel 144.

At step 212, the client computing device 104 forms the packets 180a-180n to send to the server 112 and encrypts the user data 196 using the encryption key 164, adds the forensic key 188 to the header 172, and encrypts the encrypted header data 176 using the middlebox key 168. At step 214, the client computing device 104 then sends the packets 180a-180n to the server 112 over the network 116. At step 216, the middlebox 108 then receives the packets 180a-180n sent by the client computing device 104. At step 218, the middlebox 108 determines whether the header 172 includes encrypted header data 176 encrypted using the valid middlebox key 168. If the encrypted header data 176 is encrypted using the valid middlebox key 168, then, at step 220, the middlebox 108 decrypts the encrypted header data 176 using the middlebox key 168.

The middlebox 108 analyzes the encrypted header data 176 to determine whether the encrypted header data 176 indicates that the packets 180a-180n are legitimate communications. For example, at step 222, the middlebox 108 may verify that at least a portion of the encrypted header data 176 in the packet 180a-180n matches at least a portion of client computing device 104 identifying data that is stored in the memory 140 of the server 112. The client computing device 104 identifying data may include the source IP address, the destination IP address, and/or a geographic location. The term "valid middlebox key" is generally used herein to refer to a middlebox key 168 that has an unexpired lifetime 184.

If the headers 172a-172n of the packets 180a-180n are encrypted using the valid middlebox key 168, then, at step 224, the middlebox 108 allows the packets 180a-180n to travel to the server 112 through the second communication channel 148. At step 226, the server 112 receives the packets 180a-180n through the second communication channel 148 and decrypts the packets 180a-180n using the encryption key 164. At step 228, the server 112 then initiates downstream processes using the user data 196 sent in the packets 180a-180n. If the middlebox 108 determines that the encrypted header data 176 is not what is expected, then, at step 230, the middlebox 108 saves a record of the packets 180a-180n and does not send the packets 180a-180n to the server 112.

With continued reference to FIG. 2, if the middlebox 108 determines that the headers 172a-172n of the packets 180a-180n are not encrypted using the valid middlebox key 168, then, at step 232, the middlebox 108 analyzes the packets 180a-180n to determine whether the packets 180a-180n are indicative of a DDOS attack. The middlebox 108 may use volumetric algorithms, heuristic algorithms, or protocol breaks to determine whether the packets 180a-180n are indicative of a DDOS attack. If the middlebox 108 determines that the packets 180a-180n are not indicative of a DDOS attack, then, at step 234, the middlebox 108 sends the packets 180a-180n to the first communication channel 144 of the server 112. At step 236, the server 112 then sends the encryption key 164, the first middlebox key 168a, the lifetime 184, and the forensic key 188 to the client computing device 104 using the first communication channel 144. If the middlebox 108 determines that the packets 180a-180n are indicative of a DDOS attack, at step 238, the middlebox 108 prevents the packets 180a-180n from reaching the server 112. At step 240, the middlebox 108 retrieves the forensic key 188 from the header 172 of the packets 180a-180n that are indicative of a DDOS attack. The middlebox 108 may save the forensic key 188 to the memory 132 or send the forensic key 188 to the server 112. At step 242, the middlebox 108 may analyze the forensic key 188 of the packets that are not legitimate to determine which client computing device 104 sent the packets 180a-180n indicative of a DDOS attack.

Figure 3:
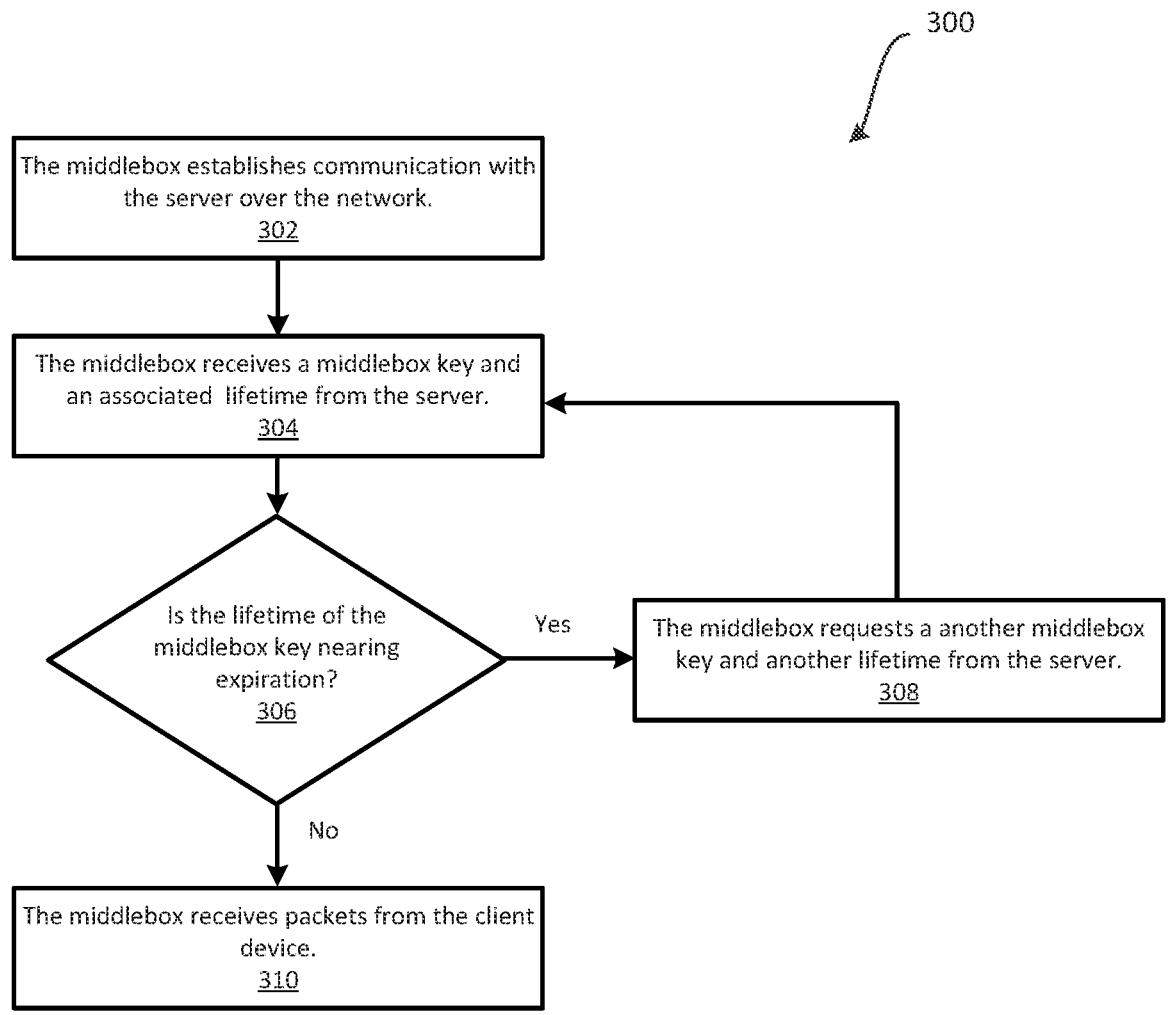
FIG. 3 illustrates an example method implemented by a middlebox according to embodiments of the present disclosure.

FIG. 3 illustrates an example method 300 implemented by a middlebox 108 according to embodiments of the present disclosure. At step 302, the middlebox 108 establishes communication with the server 112 over the network 116. At step 304, the middlebox 108 requests a middlebox key 168 and an indication of a lifetime 184 from the server 112. At step 306, after a predetermined time interval, the middlebox 108 determines whether the lifetime 184 of the middlebox key 168 is nearing expiration. If the lifetime 184 of the middlebox key 168 is not nearing expiration, then, at step 310, the middlebox 108 waits for another predetermined time interval and receives one or more data packets from a client device. If the lifetime 184 of the middlebox key 168 is nearing expiration, then, at step 308, the middlebox 108 requests another middlebox key 168 and another lifetime 184 associated with the other middlebox key 168 from the server 112 and returns to step 340. When the middlebox 108 receives the packets 180a-180n from the client computing device 104, the middlebox 108 determines whether the header 172 of the packet 180 includes encrypted header data 176 encrypted using the valid middlebox key 168.

Figure 4:
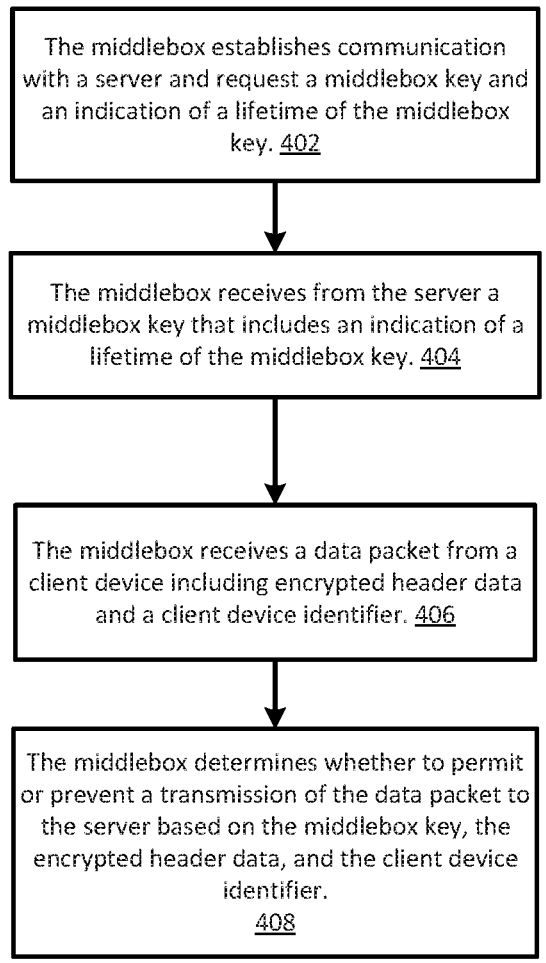
FIG. 4 illustrates another example method implemented by a middlebox according to embodiments of the present disclosure.

FIG. 4 illustrates another example method 400 implemented by a middlebox 108 according to embodiments of the present disclosure. At step 402, the middlebox 108, utilizing the at least one processor 128, may establish communication with the server 112 and request a middlebox key 168 that includes the indication of the lifetime 184 of the middlebox key 168. At step 404, the middlebox 108, utilizing the at least one processor 128, may receive from the server 112 a middlebox key 168 that includes an indication of a lifetime (e.g., a lifetime 184) of the middlebox key 168. The middlebox key 168 may be stored in a middlebox key portion of the memory 132 containing one or more middlebox keys 168a-168n. The indication of the lifetime may be stored in a lifetime portion of the memory 132 containing one or more indications of lifetimes (e.g., lifetimes) that are each associated with a middlebox key 168 stored in the middlebox key portion of the memory 132.

At step 406, the middlebox 108, utilizing the at least one processor 128, may receive, from the client device 104, one or more data packets 180 including a header 176 and body 192. The header 176 may include encrypted header data 176. The body 192 may include user data 196. In certain embodiments, the user data 196 may include a client device identifier.

At step 408, the middlebox 108, utilizing the at least one processor 128, may determine whether to permit a transmission of the one or more data packets 180 to the server 112 or prevent a transmission of the one or more data packets 180 to the server 112 based on the middlebox key 168, the encrypted header data 176, and the client device identifier. For example, the middlebox 108, utilizing the at least one processor 128, may prevent the transmission of the one or more data packets 180 to the server 112 after determining that encrypted header data 176 in the header 172 was encrypted using the middlebox key 168 and after determining that the encrypted header data 176, after decryption, does not match the client device identifier. In certain embodiments, the middlebox 108 may save (or generate and save) a record of the one or more data packets 108.

As another example, the middlebox 108, utilizing the at least one processor 128, may prevent the transmission the one or more data packets 180 to the server 112 after determining that the encrypted header data 176 was not encrypted using the middlebox key 168 (or when the header 172 does not include encrypted header data 176) and after determining that the one or more data packets 180 are indicative of a distributed denial of service (DDOS) attack. In certain embodiments, the middlebox 108, utilizing the at least one processor 128, may determine that the one or more data packets 180 are indicative of a DDOS attack based on one or more of a volumetric algorithm, a heuristic algorithm, or a protocol break. When the one or more data packets 180 are indicative of a DDOS attack and after determining to prevent the transmission of the one or more data packets 180 to the server 112, the middlebox 108, utilizing the at least one processor 128, may retrieve the forensic key 160 from the encrypted header data 176 of the one or more data packets 180. The middlebox 108, utilizing the at least one processor 128, may analyze the forensic key 160 from the encrypted header data 176 of the one or more data packets 180 to determine which client devices 104 sent the one or more data packets 180.

As yet another example, the middlebox 108, utilizing the at least one processor 128, may permit the transmission of the one or more data packets 180 to the server 112 after determining that the encrypted header data was encrypted using the middlebox key and after determining that the encrypted header data, after decryption, does match the client device identifier. In certain embodiments, the middlebox 108 may permit or direct the transmission of or may transmit the one or more data packets 180 to the server 112 via the second communication port 148 of the server 112. The server 112 may decrypt the user data 196 of the one or more data packets 180 sent through the second communication port 148 using the encryption key 164 and may initiate downstream processes using the user data 196 contained in the one or more data packets 180.

As another example, the middlebox 108, utilizing the at least one processor 128, may permit the transmission of the one or more data packets to the server after determining that the encrypted header data was not encrypted using the middlebox key 168 and after determining that the one or more data packets are not indicative of a distributed denial of service (DDOS) attack. In certain embodiments, the middlebox 108 may permit or direct the transmission of or may transmit the one or more data packets 180 to the server 112 via the first communication port 144 of the server 112. The server 112 may send or transmit the encryption key 164, the middlebox key 168, the indication of the lifetime 184, and the forensic key 160 to the client device 104 using, for example, the first communication port 144. In certain embodiments, the server and the middlebox communicate using a User Datagram Protocol (UDP)-based byte stream protocol. For example, the UDP-based byte stream protocol comprises Quick UDP Internet Connection (QUIC).

In certain embodiments, the middlebox key may be a first middlebox key and the indication may be a first indication of the lifetime of the first middlebox key. In at least this case, the middlebox 108, utilizing the at least one processor 128, may receive, from the server 112, a second middlebox 168 key that includes a second indication of a lifetime 184 of the second middlebox key 168 before the lifetime of the first indication 184 reaches an expiration time. The middlebox 108, utilizing the at least one processor 128, may determine whether to permit a transmission of the one or more data packets 180 to the server 112 or to prevent a transmission of the one or more data packets 180 to the server 112 based on the second middlebox key 168, the encrypted header data 176, and the client device identifier. In response to determining whether to permit a transmission of the one or more data packets 180 to the server 112 or to prevent a transmission of the one or more data packets 180 to the server 112, the middlebox 108, utilizing the at least one processor 128, permit the transmission of the one or more data packets 180 to the server 112 during the lifetime of the second indication 184 or prevent the transmission of the one or more data packets 180 to the server 112 during the lifetime of the second indication 184.

Figure 5:
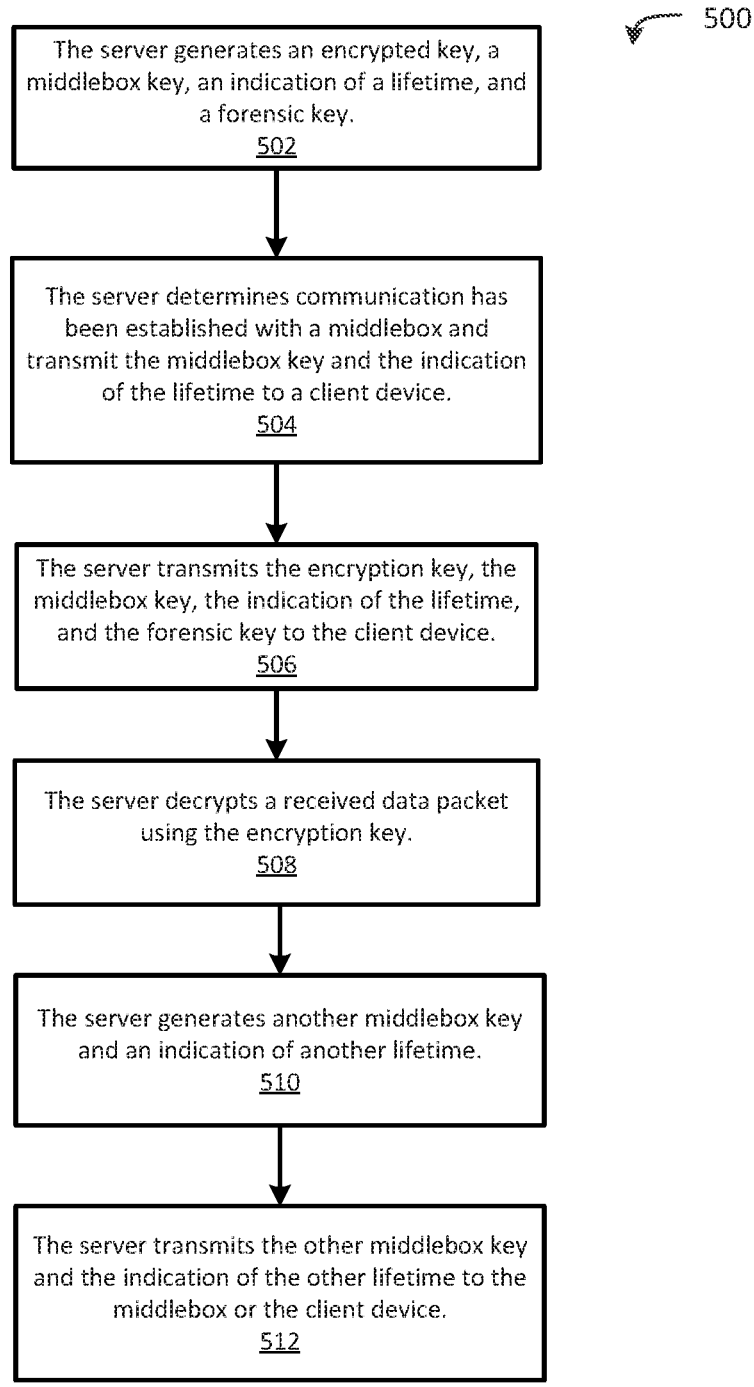
FIG. 5 illustrates an example method implemented by a server according to embodiments of the present disclosure.

FIG. 5 illustrates an example method 500 implemented by a server according to certain embodiments of this disclosure. At step 502, the server 112 may generate an encrypted key 164, a middlebox key 168, an indication of a lifetime 184 for each generated middlebox key 168, and a forensic key 184. At step 504, the server 112 may determine that communication has been established with the middlebox 108 and transmit the middlebox key 168 including the indication of the lifetime 184 of the middlebox key 168 to the client device 104, for example, after (e.g., in response to) receiving a request from the client device 104 for the middlebox key 168 including the indication of the lifetime 184. In certain embodiments, the client device 104 may establish communication with the server 112 through the first communication port 144 of the server 112.

At step 506, the server 112 may transmit the encryption key 164, the middlebox key 168 including the indication of the lifetime 180, and the forensic key 184 to the client device 104. In certain embodiments, the server 112, may transmit the encryption key 164, the middlebox key 168 including the indication of the lifetime 180, and the forensic key 184 through the first communication port 144 to the client device 104. The server 112 may transmit the encryption key 164, the middlebox key 168 including the indication of the lifetime 180, and the forensic key 184 to the client device 104 so that the client device 104 may form one or more data packets 180 including encrypted user data 196, the encrypted header data 176, and the forensic key 184 to transmit or send to the server 112.

In certain embodiments, after the client device 104 transmits or sends one or more data packets 180 including encrypted user data 196, the encrypted header data 176, and the forensic key 184 to the server 112, at step 508, the server 112 may decrypt the user data 196 of the one or more data packets 180 from the client device 104 using the encryption key 164 after the middlebox 108, utilizing the at least one processor 128, permits the transmission of the one or more data packets 180 to the server 112 after determining that the encrypted header data was encrypted using the middlebox key and after determining that the encrypted header data, after decryption, does match the client device identifier. In this case, the server 112, utilizing the one or more processors 136 may initiate one or more downstream processes using the user data contained in the one or more data packets 180. At step 510, the server 112 may generate another middlebox key and an indication of another lifetime that is associated with the other middlebox key. At step 512, the server 112 may transmit the other middlebox key and the indication of the other lifetime associated with the other middlebox key to the middlebox or the client device.

In certain embodiments, after the client device 104 transmits or sends one or more data packets 180 including encrypted user data 196, the encrypted header data 176, and the forensic key 184, the server 112, utilizing the at least one processor 136, receives the one or more data packets 180 from the client device 104, for example, through the first communication port 144 after the middlebox 108, utilizing the at least one processor 128, permits the transmission of the one or more data packets 180 to the server 112 after determining that the encrypted header data was not encrypted using the middlebox key 168 and after determining that the one or more data packets are not indicative of a distributed denial of service (DDOS) attack. The server 112 may send or transmit the encryption key 164, the middlebox key 168, the indication of the lifetime 184, and the forensic key 160 to the client device 104 using, for example, the first communication port 144. In certain embodiments, the server and the middlebox communicate using a User Datagram Protocol (UDP)-based byte stream protocol. For example, the UDP-based byte stream protocol comprises Quick UDP Internet Connection (QUIC).

Figure 6:
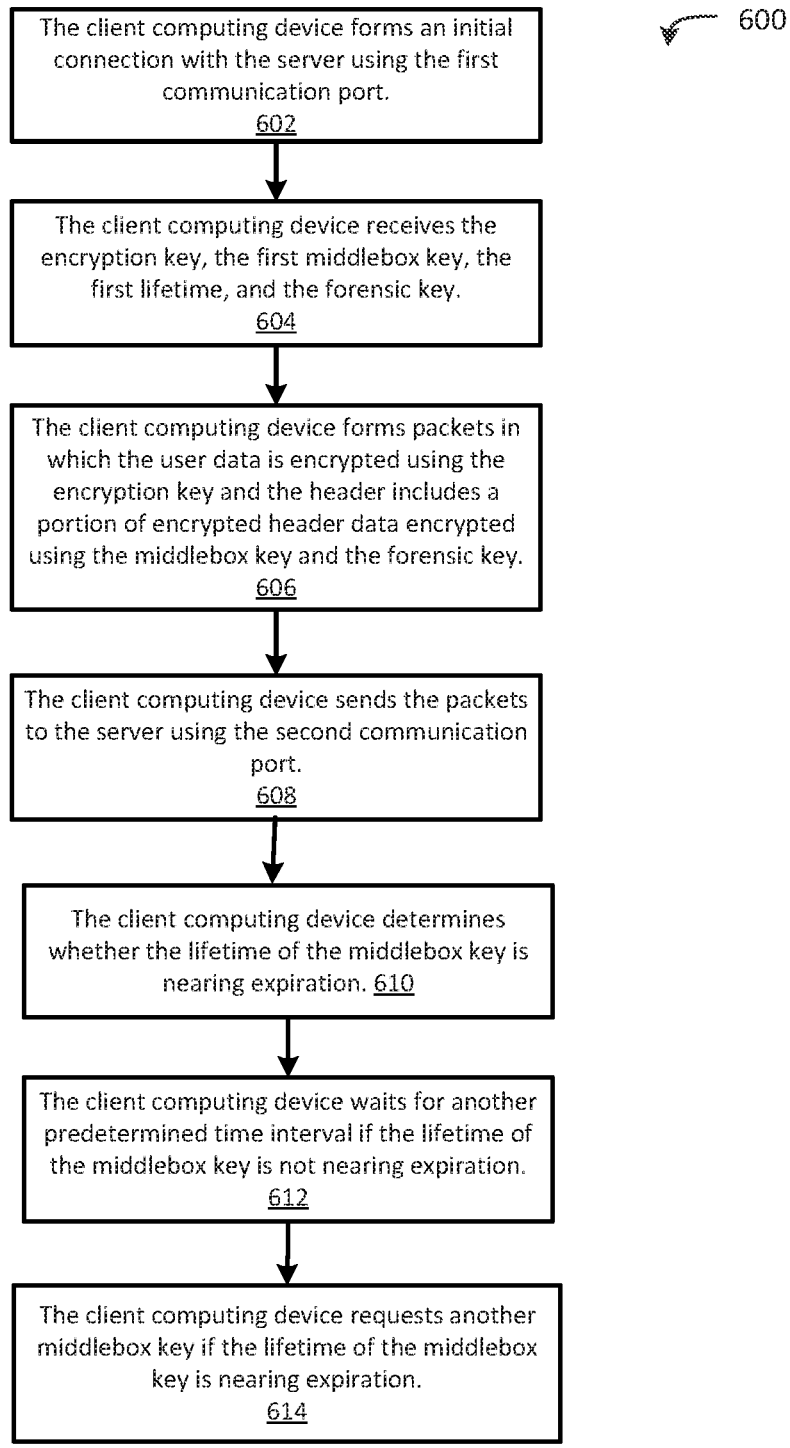
FIG. 6 illustrates an example method implemented by a client device according to embodiments of the present disclosure.

FIG. 6 illustrates an example method 600 implemented by a client computing device 104 according to certain embodiments of this disclosure. At step 602, the client computing device 104 establishes an initial communication with the server 112 using the first communication port 144. At step 604, the client computing device 104 receives the encryption key 164, the first middlebox key 168*a*, the lifetime 184*a*, and the forensic key 188 from the server 112. At step 606, the client computing device 104 then forms packets 180*a*-180*n* in which the user data 196 is encrypted using the encryption key 164 and at least a portion of the header 172 is encrypted using the valid middlebox key 168. The forensic key 188 is also added to the header 172. At step 608, the client computing device 104 then sends the packets 180*a*-180*n* to the server 112 using the second communication channel 148. After a predetermined time interval, at step 610, the client computing device 104 determines whether the lifetime 184a of the first middlebox key 168a is nearing expiration. If the lifetime 184a of the first middlebox key 168a is not nearing expiration, at step 612, the client computing device 104 waits for another predetermined time interval. If the lifetime 184a of the first middlebox key 168a is nearing expiration, at step 614, the client computing device 104 requests the second middlebox key 168b and the lifetime 184b from the server.

When the middlebox 108 determines that one or more of the packets 180a-180n are indicative of a DDOS attack, the server 112 analyses the forensic key 188 to determine an identity of the client computing device 104 from which the packet(s) 180a-180n indicative of the DDOS attack originated. In some embodiments, the identity of the client device may include an IP address, a device ID, or a geographic location.

Figure 7:
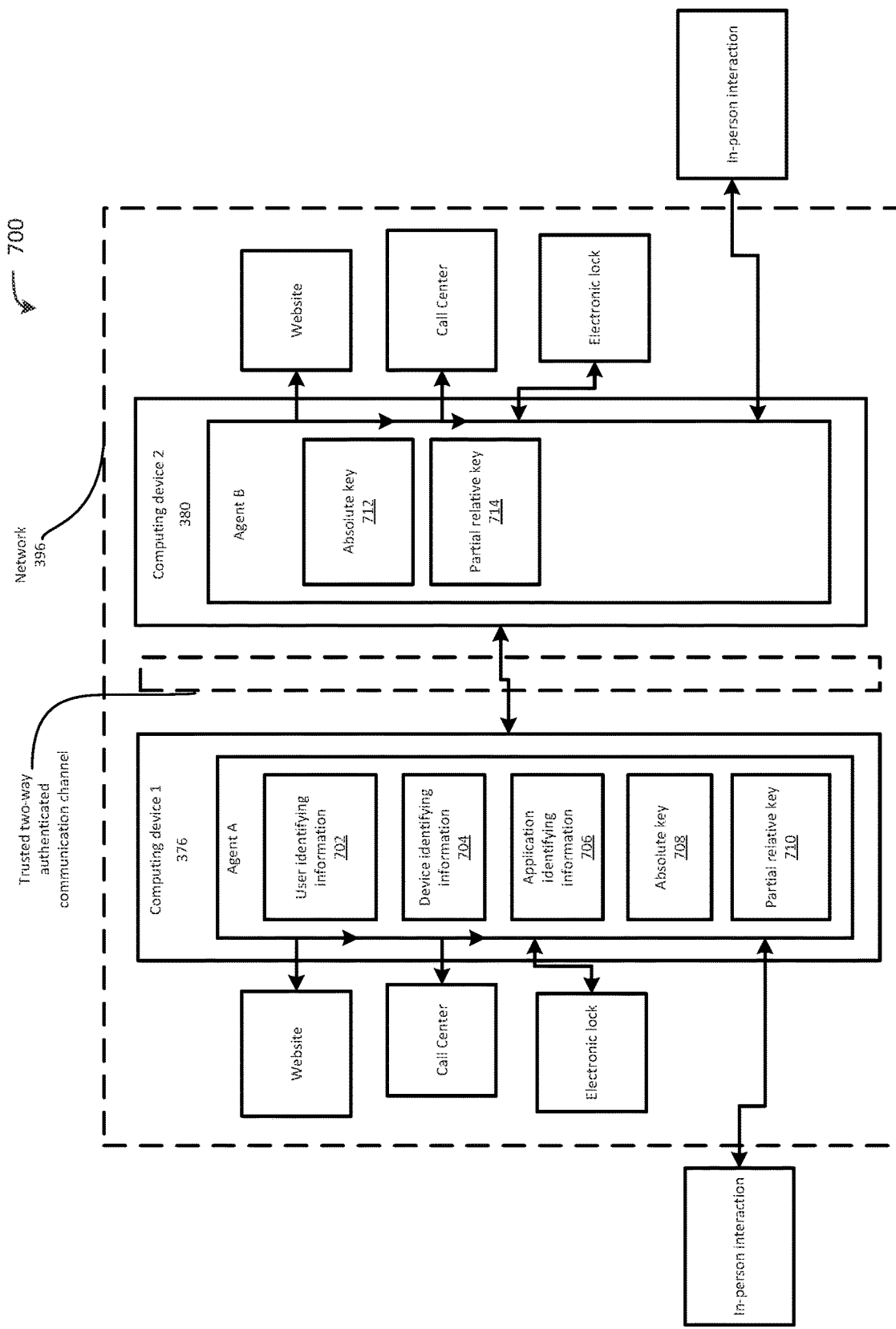
FIG. 7 illustrates an example system according to certain embodiments of this disclosure.

FIG. 7 shows a block diagram of a system 700 in which trusted two-way authenticated communication channels may be established and used in the authenticated stream of packet-based communication in some embodiments. The system 700 includes three computing devices 372, 380, 388 connected to a network 396. Although the system 700 has been shown with three computing devices, a scalable solution is described herein that can comprise additional computing devices.

The computing devices 372, 380, 388 are representative of a class of computing devices which may be any device with a processing unit and memory that may execute instructions. Computing devices may be personal computers, server computers, computing tablets, set top boxes, video game systems, personal video recorders, telephones, personal digital assistants (PDAs), portable computers, laptop computers, fax machines, cell phones and special purpose devices. Computing devices have processor and memory. These computing devices may run an operating system, including, for example, variations of the Linux, Unix, MS-DOS, Microsoft Windows, Palm OS, and Apple Mac OS X operating systems.

The network 396 provides a platform for communications between the computing devices 372, 380, 388. The network 396 may be or include local-area networks (LANs), wide-area networks (WANs), metropolitan-area networks (MANs), distributed networks and other similar networks in which computing devices may be linked together. The network 396 may provide lower layer network support for computing devices to interact with one another. The network 396 may be packet-switched and may comprise a common or private bi-directional network, and may be, for example the Internet. The network 396 may be wired or wireless. In addition, the network 396 may be configured based on client-server architecture, a peer-to-peer architecture, or any other distributed computing system architecture. Further, the network 396 may be configured to comprise additional components so as to ensure a scalable solution.

The computing devices 372, 380, 388 may include respective agents 376, 384, 392. The agents 376, 384, 392 may be securely bound to their respective computing devices 372, 380, 388. Alternatively, the agents 376, 384, 392 may be portable and installable on different computing devices at a user's discretion. For example, an agent or critical components thereof may be stored on a device such as a smart card or portable flash memory device, and a user may carry the smart card or portable flash memory device for use with various computing devices.

The agents of FIG. 7 are a first agent 376, a second agent 384, and a third agent 392. Although respectively shown with a single agent 376, 384, 392, the computing devices 372, 380, 388 may each have more than one agent. As explained herein, the agents 376, 384, 392 may have identities relative one another. The agents 376, 384, 392 may authenticate communication channels between the communications devices, and may provide security for communications on the authenticated channels. In certain embodiments, the agent 376 may include or store user identifying information 702, device identifying information 704, an application identifying information 706, an absolute key 708, and a partial relative key 710. In certain embodiments, the agent 384 may include or store an absolute key 712 and a partial relative key 714. In certain embodiments, the agent 392 may include or store user identifying information 716, device identifying information 718, and application identifying information 720.

As used herein, an agent may be or include a software module or application which may be loaded and run on a computing device. An agent may communicate with other functional units within the corresponding computing device. An agent may also communicate with agent's remote to the communications device. One function of an agent is to store certain encrypted data so as to prevent the encrypted data from being accessible (e.g., viewed) by other functional units within the computing device (e.g., applications in user space). Access may be considered restricted if the agent has exclusive access or substantially exclusive access to the tools needed to decrypt the packets, such as decryption key and software. Access may also be considered restricted if the agent has exclusive access or substantially exclusive access to the encrypted data itself.

Encrypted data is data which has been obscured to make it unreadable and unidentifiable at some level of confidence. Data which has been encrypted can be decrypted using a corresponding method or algorithm which may correspond to the method or algorithm used to encrypt the data. This data may be or may be representative of, for example, numbers, characters, audio, images, voice and video.

The relative identity of one agent to another agent may be based on information which is unique for the relationship between the two agents. The relative identity also may be based on information which is only known to the two agents in the particular relationship. With multiple computing devices 372, 380, 388 and multiple agents 376, 384, 392, there may be multiple separate relative identities in the system 368. Thus, the first user agent has an identity relative to the second user agent and a different identity relative to the third agent. Likewise, the second user agent has an identity relative to the first user agent and a different identity relative to the third agent. Finally, the third user agent has an identity relative to the first user agent and a different identity relative to the second agent. All six of these relative identities may be distinct. In short, a relative identity uniquely identifies one particular agent's relationship to another particular agent.

Even between two agents, there may be multiple unique relative identities arising from multiple relationships between the two agents. For example, an individual may have a checking account and a savings account with the same bank. Those two accounts will have a separate account numbers. Likewise, the multiple relative identities created for two particular agents could identify the separate relationships the two agents have with each other. Additional and fewer units, modules or other arrangement of software, hardware and data structures may be used to achieve the processes and apparatuses described herein.

An exemplary process of establishing a communication channel between two computing devices is provided. The description of the process is made with respect to a first agent, termed agent A, hosted by a first computing device and a second agent, termed agent B, hosted by a second computing device. These agents may be, for example, the agents 376, 384, 392 in the system 700 of FIG. 7.

The process for establishing a communication channel between agent A and agent B may include at least two parts. A first part establishes a relative identity relationship between agent A and agent B. A relative identity relationship means that agent A has a relative identity with respect to agent B and agent B has a relative identity with respect to agent A. Both agent A and agent B are aware of the existence of the relative identity relationship, but neither knows the relative identity of the other. In the second part of the process, each agent verifies the identity of the other before opening a secure trustworthy communication channel between agent A and agent B.

Initially, either agent A or agent B may initiate the process to establish a relative identity relationship. For example, agent A receives a request to establish a relative identity relationship. Agent A may define its relative identity with respect to agent B. The relative identity of agent A may be obtained from a third party and may be derived from information about the relationship between agent A and agent B, or may simply be randomly selected by agent A. Similarly, agent B defines its relative identity with respect to agent A. The relative identity of agent B may be also obtained from a third party, may be derived from information about the relationship between agent A and agent B, or may simply be randomly selected by agent B. Agent A and agent B may not disclose their relative identities to each other.

Either agent A or agent B may initiate subsequent communication at 424. Agent A may send first information to agent B. The first information may be derived from the relative identity of agent A in a manner that allows agent B to verify the identity of agent A without disclosing the relative identity of agent A. The first information may be derived from the relative identity of agent A and other data known to both agent A and agent B.

Similarly, agent B sends second information to agent A. The second information may be derived from the relative identity of agent B in a manner that allows agent A to verify the identity of agent B without disclosing the relative identity of agent B. The second information may be derived from the relative identity of agent B and other data known to both agent A and agent B.

The first and second information may be derived in numerous ways including using various algorithms well-known in the art of cryptography. For example, the first and second information can be generated by using one-way hash functions, modulus functions, cyclic arithmetic operations, and various other algorithms.

It should be recognized that the first and second information of this example may be distinct from each other. Additionally, both the first and second information are derived, in part, from the relative identities of agents A and B and are thus unique to the relationship between these two agents. While both the first and second information are derived, in part, from the relative identities of the agents A and B, respectively, the relative identities cannot be determined from the first and second information.

In certain embodiments, agent A uses the second information received from agent B to verify the identity of agent B. Similarly, agent B uses the first information received from agent A to verify the identity of agent A. A secure trustworthy communications channel is opened between agents A and B only if both agent A and B successfully verify the identity of the other agent. This process may be repeated for every communication session between agent A and agent B, or may be repeated only if secure trustworthy communications are desired between agents A and B.

Communications between agents A and B, including communications required to verify their relative identities, may be encrypted using an encryption key. The encryption key may optionally be a unique key. The communication channel that is established may be described as a secure communication channel because the identity information of either agent cannot be stolen. The identity information of an agent cannot be stolen because the identity information is not transmitted, provided or released from the agent over the network. As such, the identity of the agent is protected and is not compromised. As a result, fraudulent transactions based on using an agent's identity information are prevented since an agent's identity information cannot be obtained by an unauthorized entity.

The communication channel that is established may also be trustworthy. A trustworthy communication channel is a channel which is established between authorized entities. The communication channel is trustworthy since each agent has verified the identity of the other agent. The trust that is established and verified between the agents is based on the first and second information exchanged between the agents who, in turn, are derived from the relative identity of each agent.

Figure 9:
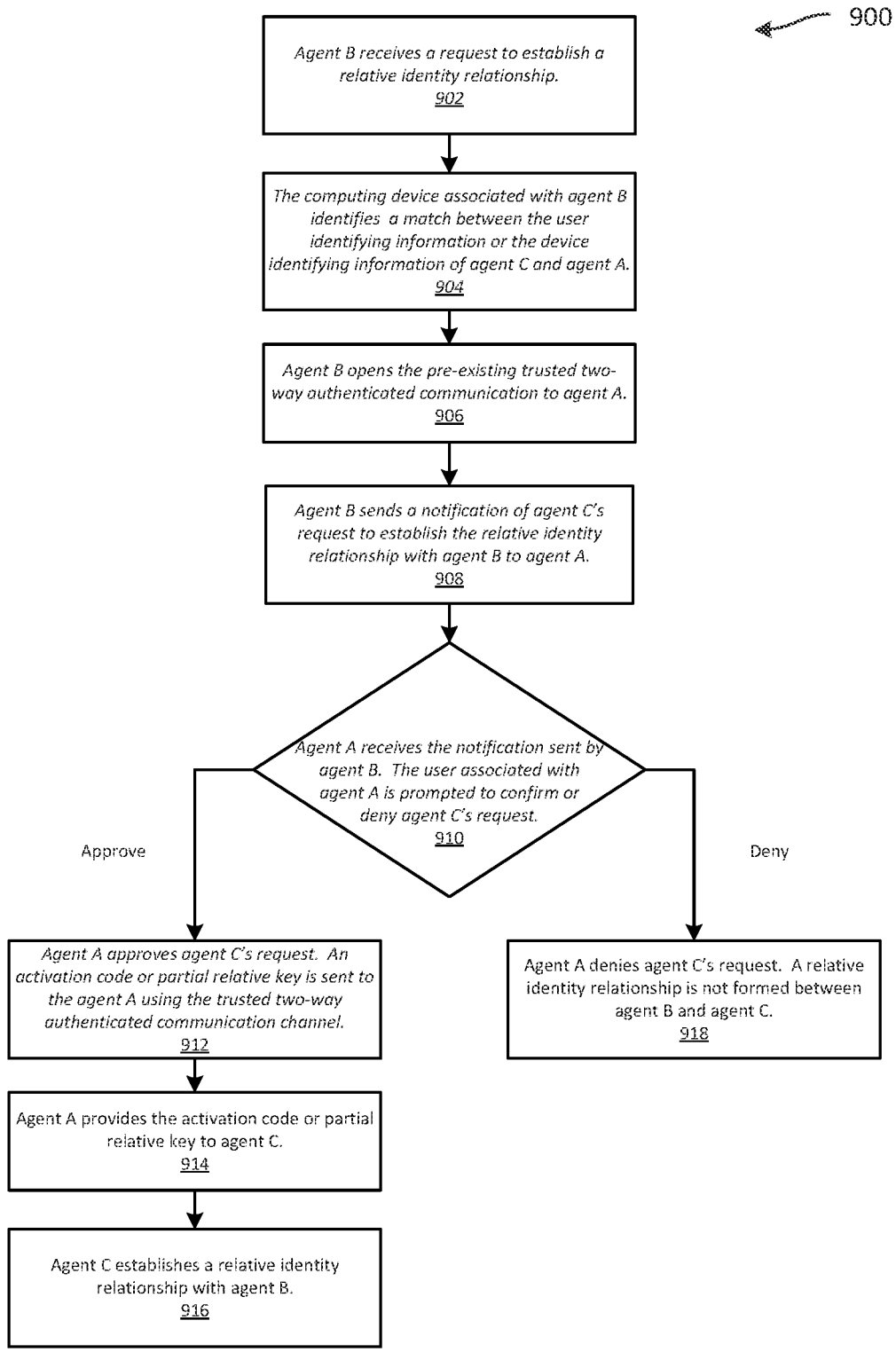
FIG. 9 illustrates an example method according to certain embodiments of this disclosure.

FIG. 9 is a block diagram of another embodiment of a process to establish a relative identity relationship between two agents. The agents are again referred to as agent A and agent B. Agent A and agent B may be first authenticated to their respective computing devices. The agents may be authenticated to their respective computing devices in a number of ways, which may be the same or different for agent A and agent B. For example, when the local agent is under a user's control, the local agent may be authenticated using absolute identity information of the user. This could be, for example, a login ID and a password, and/or biometrics.

An agent may be authenticated to the computing device through relative identity. One technique for authenticating a user-controlled agent is to provide the computing device with an embedded master agent whose sole role is to interact with other agents installed in the computing device. Thus, for example, a user-controlled agent may authenticate itself to the embedded master agent based upon a relative identity between the user-controlled agent and the embedded master agent.

Either agent A or agent B may open a communication channel to the other agent. A third party agent may optionally verify the identity of agent A and agent B and provide assurances to each agent of the identity of the other. The third party agent may be a specialized agent dedicated to verifying the identities of other agents on the network, or may be any agent that has established relative identity relationships with both agent A and agent B. The supervision of the third party agent is optional, and agent A and agent B may proceed to establish a relative identity relationship without third-party participation.

This process may be used for each agent to know or possess an absolute key and a partial relative key. Each agent's absolute key and the partial relative key may be obtained from an outside source (e.g., assigned to the agent) or may be generated within the agent. A key may be generated using numerous techniques and algorithms. Agent A may acquire or generate a unique absolute key for each relationship between itself and other agents, including agent B. Agent A may have a single partial relative key used for all relationships, or may acquire or generate a unique partial relative key for each relationship with other agents. Similarly, agent B may have a unique absolute key for each relationship, and either a single partial relative key used for all relationships or a unique partial relative key for each relationship.

An agent's absolute key may not be transmitted or revealed to any other agent on the network. Not transmitting or revealing an agent's absolute key ensures that an agent's identity information cannot be stolen from transmission through the network since the identity information is not transmitted or revealed on the network. Since an agent has a unique absolute key for each relationship and the absolute key are never transmitted or disclosed to other agents, each absolute key along with the partial relative key is equivalent to the relative identity of the agent for a specific relationship.

Agents A and B exchange their respective partial relative key. Agent A forms a first intermediate key derived from agent A's absolute key and a function of the partial relative key of both agent A and agent B. As previously described, the first intermediate key may be derived in numerous ways including using any of various algorithms or functions such as one-way hash functions, modulus functions, cyclic arithmetic operations, and various other algorithms. Similarly, agent B forms a second intermediate key derived from its absolute key and a function of the partial relative key of both agents. The first and second intermediate key can be defined as follows:

$$Kn=f(a,q(c,d))=\text{first immediate key, and}$$

$$K12=f(b,q(c,d))=\text{second immediate key}$$

where:
a=absolute key of agent A;
b=absolute key of agent B
c=partial relative key of agent A;
d=partial relative key of agent B;
f and q are suitable functions or algorithms.

It should be recognized that the first and second intermediate key of this example are distinct from each other. Additionally, both the first and second intermediate key are derived, in part, from the partial relative key of the local and remote agents and are thus unique to the relationship between these two agents. While both the first and second intermediate key are derived, in part, from the absolute key of the agent that calculated the intermediate key, the absolute key cannot be determined from the intermediate key.

Agent A may form an encryption key KAB by combining agent A's absolute key with the second intermediate key received from agent B. The combination of agent A's absolute key with the second intermediate key may be done using the same function or algorithm used to form the intermediate key. Similarly, agent B may form an encryption key KBA by combining agent B's absolute key with the first intermediate key received from agent A. The combination of agent B's absolute key with the first intermediate key may be done using the same function or algorithm used to form the intermediate key.

The function used to form the intermediate key and the encryption key may be an associative function, in which case the following relationship will hold:

$$KAB=f[a,f(b,q(c,d))]=f[b,f(a,q(c,d))]=KBA.$$

Thus both agent A and agent B may be in possession of an encryption key that may be used to encrypt subsequent communications between the agents. Moreover, since the encryption key can only be created through the use of the secret key of both agents, the key cannot be recreated by either agent alone, or by any other party, even if the other party intercepts the partial relative key and the intermediate key during transmission between agent A and agent B. After the encryption key is formed, agents A and B may each discard the partial relative key and the intermediate key received from the other agent.

Agent A and agent B may then use the encryption key and their respective absolute and partial relative key to authenticate one another at the start of subsequent communications. A process for opening a secure trustworthy communication channel between agent A and agent B may involve recreating the encryption key using information received from the other agent. Optionally, the agents and users may be authenticated using the methods previously described herein. Either agent A or agent B may open a communication channel. Agent A and agent B exchange their respective partial relative key. Agent A forms and sends the first intermediate key, and agent B forms and sends the second intermediate key. The function or algorithm used to form the first and second intermediate key may be the same as those employed when establishing the relative identity relationship between agent A and agent B. Agent A and agent B recreate the encryption key. Recreating the encryption key may be performed using the function or process previously used when establishing the relative identity relationship between agent A and agent B.

Agent A may compare the recreated encryption key with the known value of the encryption key. An exact match between the recreated and known encryption key validates the identity of agent B to agent A. Similarly agent B may validate the identity of agent A. A secure trustworthy communication channel may be opened between agent A and agent B only if both agents have successfully validated the identity of the other agent.

It must be noted that an impostor (e.g. Phisher) attempting to act as agent B must possess agent B's absolute and partial relative key, as well as have knowledge of the functions or algorithms used to form the intermediate key and encryption key. In the optional situation where the communications between agent A and agent B are encrypted using the encryption key, the imposter would have to know the encryption key as well. Since the encryption key and the absolute key are never disclosed outside of the agent or transmitted over the network, the use of relative identity provides substantial protection against phishers and other impostors.

In the example illustrated in FIG. 7, either agent A or agent B is associated with a specific user having user identifying information 702, a specific computing device having device identifying information 704, and a specific software application having application identifying information 706. The term "user identifying information" is generally used to refer to personal identifying information associated with the user. Exemplary user identification may include a name, an address, a birthdate, a social security number, a user name, a password, or factual data about the user's life or family history. The term "device identifying information" is generally used to refer to identifying information associated with a specific computing device. Exemplary device identification information may include a serial number of the device, a type of the device (e.g. mobile phone, tablet, laptop computer), or an IP address of the computing device. The term "application identifying information" is generally used to refer to identifying information associated with a specific instance of the instance of the software application. Exemplary application identifying information may include a serial number of the software application, a version of the software application, and a type of device on which the application is programmed to run (e.g. a specific brand of computing device or a specific operating system of the computing device). Either agent A, agent B, or both agent A and agent B are associated with specific user identifying information 702, device identifying information 704, or application identification information 706.

For example, in the embodiment illustrated in FIG. 7, agent A is associated with the user identifying information 702, the device identifying information 704, and the software application identifying information 706. A relative identity is then formed between agent A and agent B as described herein. A portion of the user identifying information 702, a portion of the device identifying information 704, and a portion of the application identifying information 706 is shared with agent B in the process of forming the relative identity, and a portion of the user identifying information 702, a portion of the device identifying information 704, and a portion of the application identifying information 706 is not shared with agent B. For example, for processes requiring agent A to know or possess the absolute key 708 and the partial relative key 710 and requiring agent B to know or possesses the absolute key 712 and the partial relative key 714. The absolute key 708, the absolute key 712, the partial relative key 710, and the partial relative key 714 may all include the portion of the user identifying information, the portion of the device identifying information, and the portion of the application identifying information. Accordingly, after the relative identity relationship has been established between agent A and agent B, in order to establish the trusted two-way authenticated communication channel between agent A and agent B, the user, the computing device, and the instance of the software application attempting to open the trusted two-way authenticated communication channel between agent A and agent B must be the same as the user, the computing device, and the instance of the application used to establish the relative identity relationship between agent A and agent B.

Since the relative identity established by agent A and agent B is specific to the user, the computing device, and the instance of the software application used to establish the relative identity relationship, the encryption key created in terms of the relative identity relationship is unique to the specific relationship between agent A and agent B. Accordingly, agent A and agent B have a 1:1 authentication relationship. When agent A or agent B opens the trusted two-way authenticated communication channel, agent A or agent B refers to the relative identity relationship, for example by using a relationship identifier that is distinct from the encryption key. Agent A and agent B then recreate the encryption key using the relative identity relationship. Since the relative identity is specific to the software application used to initiate the relative identity relationship, after the initial configuration of the relative identity relationship, the trusted two-way authenticated communication channel may not be opened by a generic interaction between agent A and agent B, agent A and a third party, or agent B and the third party.

Either agent A or agent B may specify an amount of user identifying information 702, device identifying information 704, or software application identifying information 706 that must be used to establish the relative identity relationship. Relative identity relationships made using a relatively large amount of user identifying information 702, device identifying information 704, or software application identifying information 706 are more secure than relative identity relationships made using a relatively small amount of user identifying information 702, device identifying information 704, or software application identifying information 706.

Figure 8:
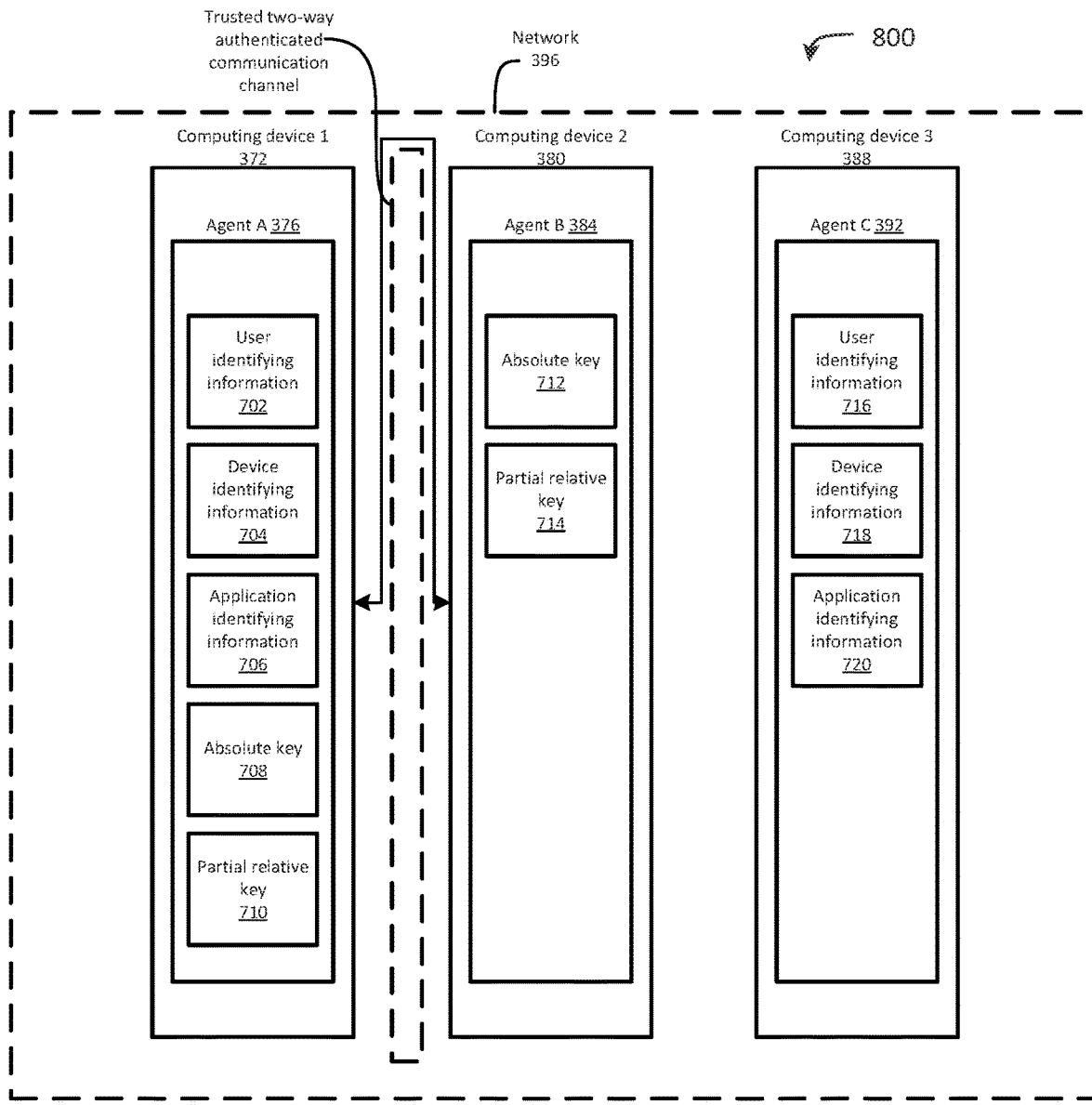
FIG. 8 illustrates an example system according to embodiments of the present disclosure.

In some embodiments, the relative identity relationship established between agent A and agent B as described with respect to FIG. 7 may be used to authenticate an attempt by a third agent, agent C, to establish a relative identity with agent B or with agent A. In the embodiment of FIGS. 8 and 9, agent A and agent C are associated with at least one of the same user or the same device. At step 902, agent B receives a request to establish the relative identity relationship from Agent C that includes the user identifying information 716, the device identifying information 718, and the application identifying information 720 corresponding to agent C. At step 904, after receiving the request from agent C, the computing device associated with agent B identifies a match between at least one of the user identity information and the device identity information of agent A. At step 906, agent B then opens the trusted two-way authenticated communication channel using the previously-established relative identity relationship between agent A and agent B. At step 908, after opening the trusted two-way authenticated communication channel, agent B sends a notification of agent C's request to establish the relative identity relationship to agent A and prompts agent A to confirm or deny agent C's request to establish the relative identity relationship. The notification sent by agent B to agent A over the trusted two-way authenticated communication channel includes the user identifying information 552, the device identifying information 556, and the application identifying information 560 sent with agent C's request. At step 910, after receiving the notification sent by agent B, a user controlling agent A may confirm or deny agent C's request. If agent A approves agent C's request, at step 912, agent B sends agent A a notification that includes information for use in establishing the relative identity between agent B and agent C, such as an activation code or the partial relative key 576, to agent A using the trusted two-way authenticated communication channel. At step 914, agent A then provides the information for use in establishing the relative identity between agent B and agent C to agent C. At step 916, agent B and agent C then establish the relative identity relationship using the process described above in FIGS. 8 and 10. If agent A denies agent C's request, at step 918, the relative identity relationship is not formed between agent A and agent B. Accordingly, the trusted two-way authenticated communication channel between agent B and agent C may be authenticated without the use of a third-party authentication service or a third-party verification or certification service.

In some embodiments, the relative identity relationship established between agent A and agent B or agent C and agent B may be used to authenticate an attempt by a fourth agent, agent D, to establish a relative identity with agent B. As described above with respect to the authentication of agent C's attempt to establish a relative identity relationship with agent B, the previously-established relative identity relationship between agent A and agent B or agent C and agent B may be opened in response to a request from agent D to form a relative identity relationship with agent B. Accordingly, the trusted two-way authenticated communication channel between agent B and agent C may be authenticated without the use of a third-party authentication service or a third-party verification or certification service.

In some constructions, any of the instances of the software application may be operable to manage the relative identity relationships. For example, if a user is associated with several agents, for example agents A, C, and D that have relative identity relationships with another agent, such as agent B, the instance of the software application associated with one of agent A, agent C, or agent D may be used to remove relative identity relationships between agent B and the others of agent A, agent C, or agent D. In some constructions, the most recently established of the agents associated with a user such as, for example, agents A, C, or D associated with a user cannot be used to remove the agent that was used to confirm the most recently established agent's request to form a relative identity relationship with another agent, such as agent B.

In an exemplary embodiment involving the system of FIG. 7 and the method of FIG. 9, agent A may be a customer and agent B may be a bank. The customer downloads a first copy of the software application provided by the bank onto a first computing device having first device identity information. Each instance (e.g. copy) of the software application includes unique application identity information. When the customer opens the first copy of the software application for a first time, the first copy of the software application prompts the customer to enter the personal identifying information or the absolute identity information of the user. The customer then uses the first copy of the software application to request to establish the relative identity relationship with the bank. A portion of the user identifying information 702, the device identifying information 704, and the application identifying information 706 of the customer is sent to the bank. The bank sends information to the customer for use in establishing the relative identity relationship with the customer as described herein. For example, the customer's account number for a specific account in the bank may be used to generate the relative identity relationship. After the relative identity relationship between the customer and the bank is formed, the customer and the bank may use the software application to communicate using the trusted two-way authenticated communication channel. In some constructions, the user identifying information or the absolute identity information used to establish the relative identity between the customer and the bank is stored in a memory of the computing device associated with the customer and accessed by the first copy of the software application when the customer opens the secure communication channel. In other constructions, the user identifying information or absolute identity information used to establish the relative identity relationship between the customer and the bank is not stored on the first copy of the software application and must be entered the customer each time the trusted two-way communication channel is opened.

Since the relative identity relationship established between the customer and the bank is created using a portion of the user identifying information 702, a portion of the device identifying information 704, and a portion of the application identifying information 706, the trusted two-way authenticated communication channel can only be open if the user, the device, and the copy of the application used to initiate the attempt to open the trusted two-way authenticated communication channel are all the same as the user, the device, and the copy of the application are the same as were used to establish the relative identity relationship between the customer and the bank. For example, if the customer deletes the first copy of the software application from the first computing device and installs a second copy of the software application onto the first computing device, the customer cannot use the second copy of the software application to access the trusted two-way authenticated communication channel established using the first copy of the software application. Instead, the customer will be prompted to establish a new relative identity relationship with the bank when the user tries to use the second copy of the software application to open the trusted two-way authenticated communication channel. Similarly, a person other than the customer who established the trusted two-way authenticated communication channel attempts to the customer cannot use the first copy of the software application to access the trusted two-way authenticated communication channel established by the customer. Instead, the person other than the customer will be prompted to establish a new relative identity relationship with the bank when the person other than the customer tries to use open the trusted two-way authenticated communication channel.

Continuing with the present example, the customer may download a third copy of the software application onto a second computing device. When the customer opens the third copy of the software application for a first time, the third copy of the software application prompts the customer to enter personal identifying information or absolute identify information to the third copy of the software application. The customer then uses the third copy of the software application to request to establish a relative identity relationship with the bank. A portion of the user identifying information 702, a portion of the device identifying information 704, and a portion of the application identifying information 706 of the customer is sent to the bank and the bank sends information to the customer for use in establishing the relative identity relationship with the customer as described herein. Since the customer has a pre-existing relative identity relationship with the bank using the first copy of the software application and the first computing device, a portion of the user identifying information 702 sent in the third software application's request to establish a relative identity relationship will match a portion of the user identifying information 702 associated with the customer's existing relative identity relationship with the bank. After identifying the match between the request sent by the third copy of the software app and the customer, the bank opens the trusted communication channel between the customer, the first device, and the first copy of the software application (e.g. a pre-existing trusted two-way authenticated communication channel) and sends a notification of the third copy of the application's request to the customer over the pre-existing trusted two-way authenticated communication channel. The notification includes at least a portion of the user identifying information 702, a portion of the device identifying information 704, and a portion of the application identifying information 706 that the third copy of the software application included in the request to the bank. After receiving the notification sent over the pre-existing trusted two-way authenticated communication channel, the customer may approve or deny the request sent by the third copy of the software application. Since in this example, the request is a genuine request made by the customer, the customer approves the request included in the notification using the pre-existing trusted two-way communication channel. After receiving the customer's approval of the request, the bank sends the activation code or the partial key to the customer using the pre-existing trusted two-way communication channel. After receiving the activation code or the partial key from the bank, the customer may enter the activation code or the partial key into the third copy of the software application. After the customer has approved the request, the third copy of the software application and the bank establishes the relative identity relationship. When the request is not a genuine request made by the customer, the customer may deny the request included using the pre-existing trusted two-way communication channel, and a relative identity relationship is not established. In some constructions, the user identifying information 702, the device identifying information 704, and the application identifying information 706 may be retained by the bank.

In some embodiments, the pre-existing trusted two-way authenticated communication channel may be leveraged to authenticate requests made between agent A and agent B over an unsecured connection. Exemplary unsecured connections may include a web browser, a telephone to a call center, or an in-person interaction (e.g. between a customer and an employee of a service provider). Agent A and agent B may have the relative identity relationship that allows agent A and agent B to communicate using the trusted two-way authenticated communication channel. Agent A and agent B may also communicate using the unsecured connection. When agent A and agent B communicate using the unsecured connection, either agent A or agent B may use the pre-existing trusted two-way authenticated communication channel to request confirmation of instructions or a request made by agent A or agent B using the unsecured communication channel prior to following the instructions or responding to the request. In this manner, the pre-existing authenticated trusted two-way communication channel may be leveraged to validate the relative identity relationship between agent A and agent B without relying on third-party validation services or requiring personal identifying information or absolute identity information to be shared over the unsecured connection.

In certain embodiments, agent A may be a customer and agent B may be a bank. The customer has downloaded the software application provided by the bank onto the computing device. The customer has used the software application to establish the relative identity relationship with the bank. The relative identity has been established using a portion of the customer's user identifying information 702, a portion of the device identifying information 704, and a portion of the application identifying information 706 and the partial relative key 710 associated with the bank. Since the customer and the bank have established the relative identity relationship, the customer and the bank may use the software application to communicate using the trusted two-way authenticated communication channel.

Figure 10:
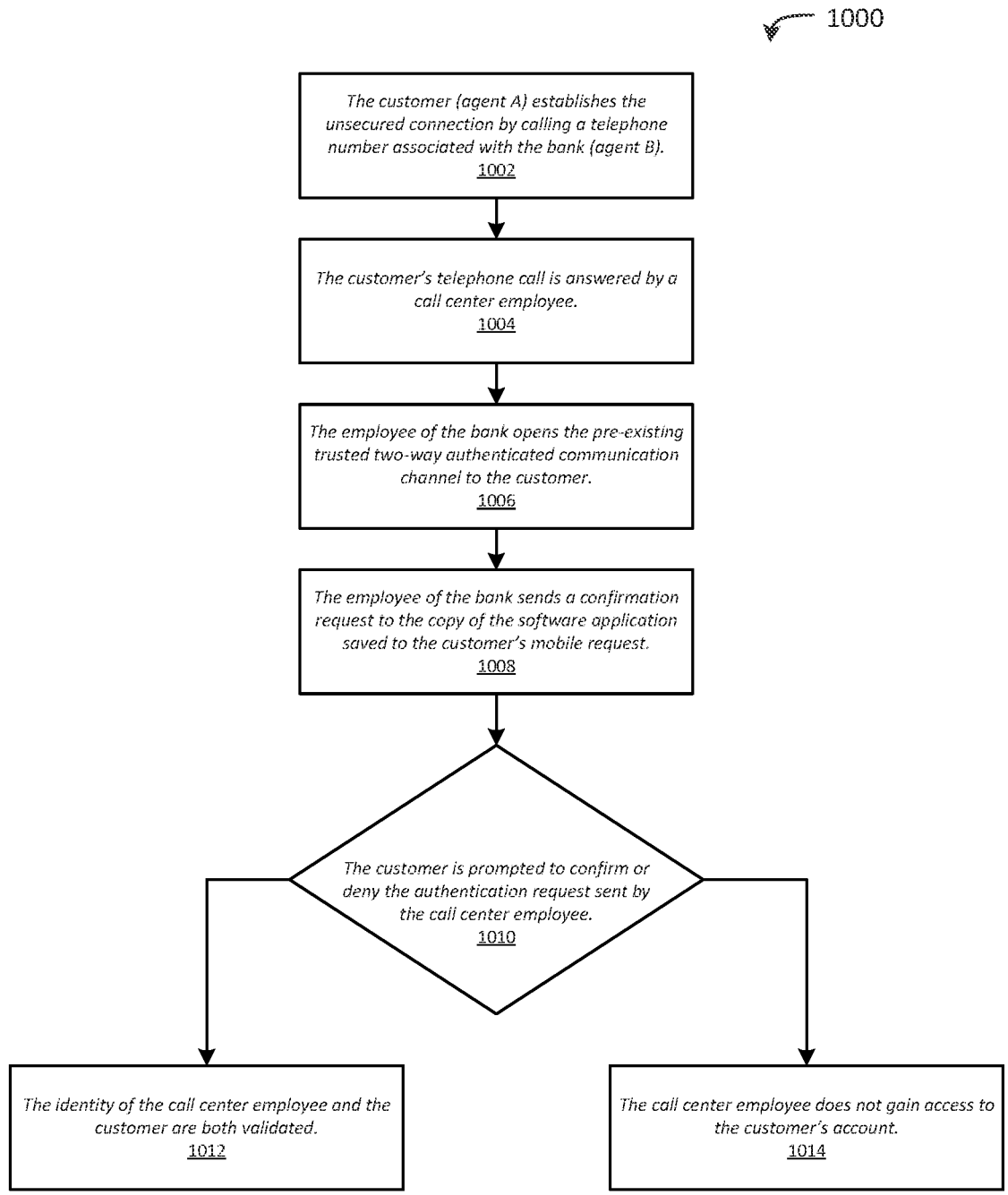
FIG. 10 illustrates an example method according to embodiments of the present disclosure.

In addition to communicating using the trusted two-way authenticated communication channel, the customer and the bank may communicate over an unsecured communication channel. FIG. 10 illustrates an example method 1000 according to certain embodiments of this disclosure. The unsecured communication channel is a phone call to a call center associated with the bank. As shown in FIG. 10, at step 1002, the customer establishes the unsecured connection by calling a telephone number associated with the bank. At step 1004, the customer's telephone call is answered by a call center employee. At the time that the customer's telephone call is answered, the customer has no verification that the person that answered the telephone call is an employee of the bank and the employee of the bank has no verification that the caller is actually the customer. Accordingly, at step 1006, after answering the telephone call, the employee of the bank may open the trusted two-way authenticated communication channel to for mutual verification between the customer and the bank. For example, at step 1008, the employee of the bank may send a confirmation request to the copy of the software application saved to the customer's mobile device requesting the customer authenticate that the call is genuine. At step 1010, the customer is prompted to accept or deny the authentication request. If the customer accepts the authentication request, then, at step 1012, the identity of both the customer and the bank are validated without the exchange of personal identifying information between the customer and the employee at the call center. If the customer denies the confirmation request, then, at step 1014, the call center employee is denied access to the customer's account information.

In some embodiments, the notification sent to the customer is customizable. For example, in some embodiments, the employee of the bank introduces him or herself on the phone before sending the request. The notification sent to the customer would then include a name of the employee at the call center, so that the customer could have confirmation through the trusted two-way authenticated communication channel that the person on the phone call is actually an employee of the bank. For example, the notification may indicate the name and the location of the employee of the bank that was previously communicated to the customer during the phone call.

In some embodiments, the trusted two-way authenticated communication channel may be used to approve specific transaction made by the customer using the customer's account at the bank. For example, whenever a transaction using a credit card or a debit card is made by the customer, the bank may open the trusted two-way authenticated communication channel with the customer and send the customer a notification of the transaction. The notification requires the customer to approve or deny the transaction before the bank releases the funds for the transaction. In some embodiments, the customer may customize the transactions that require approval. For example, the customer may only require approval for transactions exceeding a predetermined amount of money. In some embodiments, the bank may customize the transactions that require verified approval. For example, the bank may require authenticated verification for any requests to transfer funds, add a new person to an account, change an address associated with the account, or change a beneficiary of the account. In such an embodiment, after receiving a request to transfer funds from the customer, the bank sends a notification to the copy of the software application saved on the customer's device using the trusted two-way authenticated communication channel. In some embodiments, the bank may customize the text of the notification for each transaction. For example, the confirmation request may include an account number from which the money will be withdrawn, an account number to which the money will be transferred, and an amount of money that will be transferred. In such an embodiment, the bank may save the customer's approval of the request to have an auditable trail of the transaction. Since the notification is sent to the customer before the transaction occurs, the customer has an additional opportunity to confirm that transaction request is correct. If the transaction request is incorrect, the customer may deny the confirmation request included in the notification before the money is transferred incorrectly. Furthermore, if the transaction included in the confirmation request is fraudulent, the customer may deny the transaction request before the money has been transferred to the thief.

In other embodiments, the trusted two-way authenticated communication channel may be used to confirm requests made between agent A and agent B using other types of unsecured communication channels. For example, in some embodiments, the unsecured communication channel may be a web browser, agent A may be a customer, and agent B may be a service provider that has a website accessible by a browser. In such an embodiment, agent A and agent B have established the relative identification as described above. Accordingly, before the user makes a transaction request from the service provider, the customer may leverage the trusted two-way authentication channel to confirm that the webpage is genuinely associated with the service provider before making a transaction. The customer or the service provider may also leverage the trusted two-way authenticated communication channel to confirm or deny service requests or transaction requests made using the browser without relying on third-party verification services.

In other embodiments, the unsecured communication channel may be an in-person interaction. In such an embodiment, agent A is a customer, and agent B is a service provider. The customer interacts in-person with the service provider through an employee of the service provider. In such an embodiment, the customer and the service provider have established a relative identity relationship as described above. Accordingly, when beginning an in-person interaction between the customer or the employee, the customer may leverage the trusted two-way authenticated communication channel to require the employee to confirm a relationship to the service provider. The employee may leverage the trusted two-way authenticated communication channel to confirm that the customer does have a relationship with the service provider without requiring the customer to provide any personal identifying information in a public setting.

In other embodiments, the unsecured communication channel may be a physical lock, such as a lockbox or a locked door. In such an embodiment, agent A is a user, and agent B the owner of the lock. In such an embodiment, agent A and agent B have established the relative identification as described above. Accordingly, when agent A requests access to the locked box or the locked door, agent A may leverage the existing two-way authenticated communication channel to send an access request to agent B to unlock the door. After agent B has approved the access request sent by agent A, the door may unlock. Agent B may also deny permission for agent A to unlock the door. In some constructions, the access request sent by agent A may be customized by agent B. For example, the access request sent by agent A may include an identity of the requester, a time and a data of the access request, and a location of the access request. Agent B may store the access requests from agent A and confirmation responses sent from agent B to agent A to have an auditable trail of agents that have requested access and agents that have been granted access.

Figure 11:
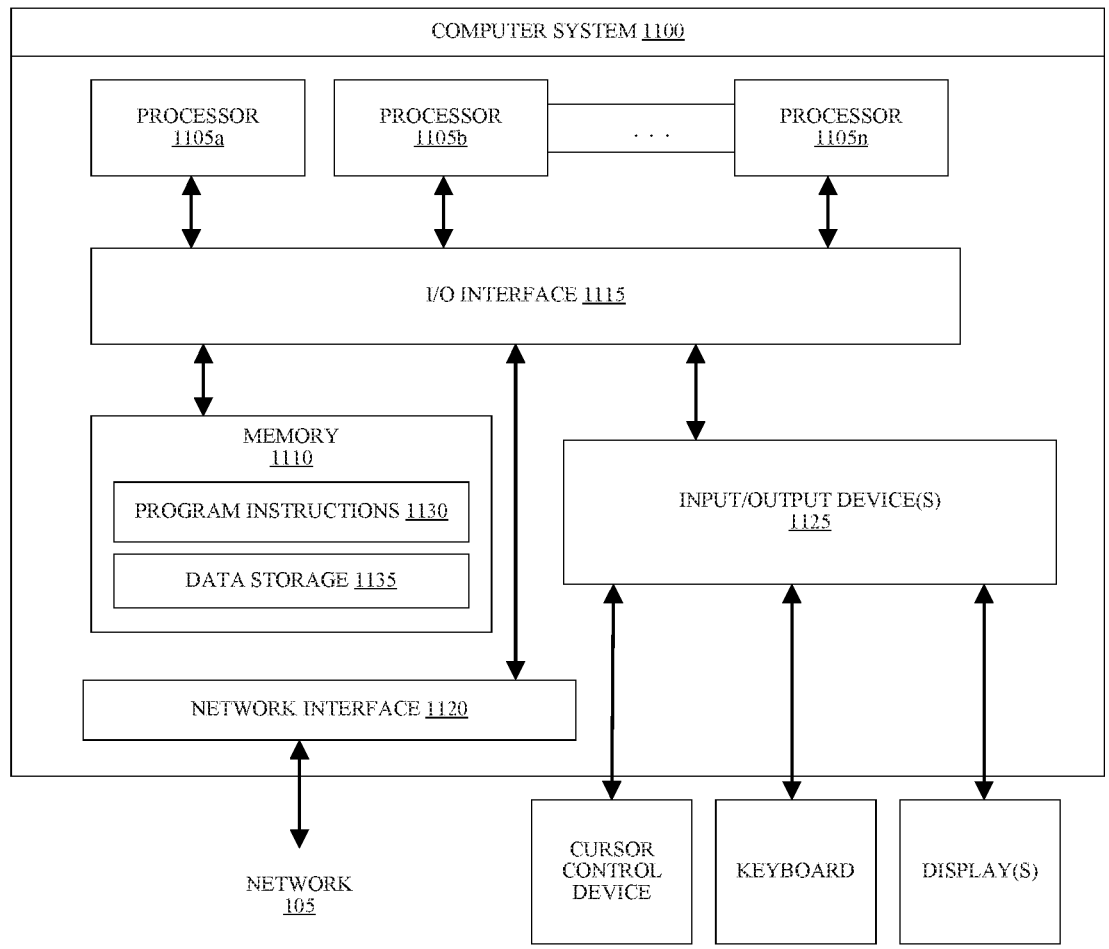
FIG. 11 illustrates a non-limiting, example computer system configured to implement aspects of systems and methods according to certain embodiments of this disclosure.

FIG. 11 illustrates a non-limiting, example computer system 1100 configured to implement systems and methods described herein according to certain embodiments of this disclosure. FIG. 11 illustrates a computer system 1100 that is configured to execute any and all of the embodiments described herein. In certain embodiments, the computer system 1100 describes at least some of the components of a middlebox, a server, or a client device as described herein. In different embodiments, the computer system 1100 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 230 of a transport container, a handset, or the like), an application server, a storage device, a television, a peripheral device such as a switch, modem, router, or in general any type of computing or electronic device.

Various embodiments of the systems and methods described herein, may be executed on one or more computer systems 1100, which may interact with various other devices. In the illustrated embodiment, the computer system 1100 includes one or more processors 1105 coupled to a system memory 1110 via an input/output (I/O) interface 1115. The computer system 1100 further includes a network interface 1120 coupled to I/O interface 1115, and one or more input/output devices 1125, such as cursor control device, keyboard, and display(s). In some cases, it is contemplated that embodiments may be implemented using a single instance of computer system 1100, while in other embodiments multiple such systems, or multiple nodes making up computer system 1100, may be configured to host different portions or instances of embodiments.

For example, in one embodiment some elements may be implemented via one or more nodes of computer system 1100 that are distinct from those nodes implementing other elements.

In various embodiments, computer system 1100 may be a uniprocessor system including one processor $1105a$, or a multiprocessor system including several processors $1105a$-$1105n$ (e.g., two, four, eight, or another suitable number). The processors 1105 may be any suitable processor capable of executing instructions. For example, in various embodiments the processors 1105 may be general-purpose or embedded processors implementing any of a variety of instruction set architectures (ISAs), such as the x86, PowerPC, SPARC, or MIPS ISAs, or any other suitable ISA. In multiprocessor systems, each of processors 1105 may commonly, but not necessarily, implement the same ISA.

The system memory 1110 may be configured to store the program instructions 1130 and/or data in the data storage 1135 accessible by the processor 1105. In various embodiments, the system memory 1110 may be implemented using any suitable memory technology, such as static random access memory (SRAM), synchronous dynamic RAM (SDRAM), nonvolatile/Flash-type memory, or any other type of memory. In the illustrated embodiment, the program instructions 1130 may be configured to implement a system for package delivery incorporating any of the functionality, as described herein. In some embodiments, program instructions and/or data may be received, sent, or stored upon different types of computer-accessible media or on similar media separate from the system memory 1110 or the computer system 1100. The computer system 1100 is described as implementing at least some of the functionality of the various components described herein.

In one embodiment, the I/O interface 1115 may be configured to coordinate I/O traffic between the processor 1105, the system memory 1110, and any peripheral devices in the device, including the network interface 1120 or other peripheral interfaces, such as the input/output devices 1125. In some embodiments, the I/O interface 1115 may perform any necessary protocol, timing or other data transformations to convert data signals from one component (e.g., the system memory 1110) into a format suitable for use by another component (e.g., the processor 1105). In some embodiments, the I/O interface 1115 may include support for devices attached through various types of peripheral buses, such as a variant of the Peripheral Component Interconnect (PCI) bus standard or the Universal Serial Bus (USB) standard, for example. In some embodiments, the function of the I/O interface 1115 may be split into two or more separate components, such as a north bridge and a south bridge, for example. Also, in some embodiments some or all of the functionality of the I/O interface 1115, such as an interface to the system memory 1110, may be incorporated directly into the processor 1105.

The network interface 1120 may be configured to allow data to be exchanged between the computer system 1100 and other devices attached to the network 105 or between nodes of the computer system 1100. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1120 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1125 may, in some embodiments, include one or more display terminals, keyboards, keypads, touchpads, scanning devices, voice, or optical recognition devices, or any other devices suitable for entering or accessing data by one or more the computer systems 1100. Further, various other sensors may be included in the I/O devices 1125, such as imaging sensors, barometers, altimeters, LIDAR, or any suitable environmental sensor. Multiple input/output devices 1125 may be present in the computer system 1100 or may be distributed on various nodes of the computer system 1100. In some embodiments, similar input/output devices may be separate from the computer system 1100 and may interact with one or more nodes of the computer system 1100 through a wired or wireless connection, such as over the network interface 1120.

As shown in FIG. 11, the memory 1110 may include program instructions 1130, which may be processor-executable to implement any element or action, as described herein. In one embodiment, the program instructions may implement at least a portion of methods described herein, such as the methods illustrated by figures or described herein. In other embodiments, different elements and data may be included. Note that the data storage 1135 may include any data or information, as described herein.

Those skilled in the art will appreciate that the computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A middlebox may include at least one processor and a memory storing one or more executable instructions that, when executed by the least one processor, cause the at least one processor to receive, from a server, a middlebox key that includes an indication of a lifetime of the middlebox key, receive, from a client device, one or more data packets including encrypted header data and a client device identifier, and determine whether to permit a transmission of the one or more data packets to the server or prevent a transmission of the one or more data packets to the server based on the middlebox key, the encrypted header data, and the client device identifier. The one or more executable instructions, when executed by the at least one processor, may further cause the at least one processor to prevent the transmission of the one or more data packets to the server after determining that the encrypted header data was encrypted using the middlebox key, and determining that the encrypted header data, after decryption, does not match the client device identifier. The one or more executable instructions, when executed by the at least one processor, may further cause the at least one processor to prevent the transmission the one or more data packets to the server after determining that the encrypted header data was not encrypted using the middlebox key, determining that the one or more data packets are indicative of a distributed denial of service (DDOS) attack.

The one or more executable instructions, when executed by the at least one processor, may cause the at least one processor to determine that the one or more data packets are indicative of a DDOS attack based on one or more of a volumetric algorithm, a heuristic algorithm, or a protocol break. The one or more executable instructions, when executed by the at least one processor, may further cause the at least one processor to permit the transmission the one or more data packets to the server after determining that the encrypted header data was encrypted using the middlebox key, and determining that the encrypted header data, after decryption, does match the client device identifier.

The one or more executable instructions, when executed by the at least one processor, may further cause the at least one processor to permit the transmission of the one or more data packets to the server after determining that the encrypted header data was not encrypted using the middlebox key, and determining that the one or more data packets are not indicative of a distributed denial of service (DDOS) attack. The middlebox key may be a first middlebox key. The indication may be a first indication of the lifetime of the first middlebox key, and the one or more executable instructions, when executed by the at least one processor, may further cause the at least one processor to receive, from the server, a second middlebox key that includes a second indication of a lifetime of the second middlebox key before the lifetime of the first indication reaches an expiration time, determine whether to permit a transmission of the one or more data packets to the server or to prevent a transmission of the one or more data packets to the server based on the second middlebox key, the encrypted header data, and the client device identifier, and in response to determining whether to permit a transmission of the one or more data packets to the server or to prevent a transmission of the one or more data packets to the server permit the transmission of the one or more data packets to the server during the lifetime of the second indication, or prevent the transmission of the one or more data packets to the server during the lifetime of the second indication.

The encrypted header data may include a forensic key, and the one or more executable instructions, when executed by the at least one processor, may further cause the at least one processor to retrieve the forensic key from the encrypted header data of the one or more data packets after determining to prevent the transmission of the one or more data packets to the server. The server and the middlebox may communicate using a User Datagram Protocol (UDP)-based byte stream protocol. The UDP-based byte stream protocol may include Quick UDP Internet Connection (QUIC).

A method implemented by at least one processor of a middlebox may include receiving, by the at least one processor and from a server, a middlebox key that includes an indication of a lifetime of the middlebox key, receiving, by the at least one processor and from a client device, one or more data packets including encrypted header data and a client device identifier, and determining, by the at least one processor, whether to permit a transmission of the one or more data packets to the server or prevent a transmission of the one or more data packets to the server based on the middlebox key, the encrypted header data, and the client device identifier. The method may further include preventing, by the at least one processor, the transmission of the one or more data packets to the server after determining, by the at least one processor, that the encrypted header data was encrypted using the middlebox key, and determining, by the at least one processor, that the encrypted header data, after decryption, does not match the client device identifier.

The method may further includes preventing, by the at least one processor, the transmission the one or more data packets to the server after determining, by the at least one processor, that the encrypted header data was not encrypted using the middlebox key, and determining, by the at least one processor, that the one or more data packets are indicative of a distributed denial of service (DDOS) attack. The method may include determining, by the at least one processor, that the one or more data packets are indicative of a DDOS attack based on one or more of a volumetric algorithm, a heuristic algorithm, or a protocol break. The method may further include permitting, by the at least one processor, the transmission the one or more data packets to the server after determining, by the at least one processor, that the encrypted header data was encrypted using the middlebox key, and determining, by the at least one processor, that the encrypted header data, after decryption, does match the client device identifier. The method may further include permitting, by the at least one processor, the transmission of the one or more data packets to the server after determining, by the at least one processor, that the encrypted header data was not encrypted using the middlebox key, and determining, by the at least one processor, that the one or more data packets are not indicative of a distributed denial of service (DDOS) attack.

The middlebox key may be a first middlebox key. The indication may be a first indication of the lifetime of the first middlebox key. The method may further include receiving, by the at least one processor and from the server, a second middlebox key that includes a second indication of a lifetime of the second middlebox key before the lifetime of the first indication reaches an expiration time, determining, by the at least one processor, whether to permit a transmission of the one or more data packets to the server or to prevent a transmission of the one or more data packets to the server based on the second middlebox key, the encrypted header data, and the client device identifier, and in response to determining whether permit a transmission of the one or more data packets to the server or to prevent a transmission of the one or more data packets to the server permitting, by the at least one processor, the transmission of the one or more data packets to the server during the lifetime of the second indication, or preventing, by the at least one processor, the transmission of the one or more data packets to the server during the lifetime of the second indication.

The encrypted header data may include a forensic key. The method may further include retrieving, by the at least one processor, the forensic key from the encrypted header data after determining to prevent the transmission of the one or more data packets to the server. The server and the middlebox communicate using a User Datagram Protocol (UDP)-based byte stream protocol. The UDP-based byte stream protocol may include Quick UDP Internet Connection (QUIC).

A server may include at least one processor and a memory storing one or more executable instructions that, when executed by the least one processor, cause the at least one processor to generate an encryption key and a middlebox key, wherein the middlebox key includes an indication of a lifetime of the middlebox key, transmit the middlebox key including the indication to a middlebox, transmit the encryption key, the middlebox key, and the indication to a client device, and receive one or more data packets from the client device when the one or more data packets include encrypted header data that is encrypted using the middlebox key.

The one or more executable instructions, when executed by the at least one processor, may cause the at least one processor to receive one or more data packets from the client device when the one or more data packets are not indicative of a distributed denial of service (DDOS) attack based on one or more of a volumetric algorithm, a heuristic algorithm, or a protocol break. The one or more executable instructions, when executed by the at least one processor, may further cause the at least one processor to generate a forensic key and transmit the forensic key to the client device.

The forensic key may be used to determine an identity of the client device when at least one data packet of the one or more data packets received from the client device is indicative of a DDOS attack. The middlebox key may be a first middlebox key. The indication may be a first indication. The one or more executable instructions, when executed by the at least one processor, may further cause the at least one processor to transmit, to the middlebox, a second middlebox key including a second indication of a lifetime of the second middlebox key when the lifetime of the first indication nears an expiration time. The server and the middlebox may communicate using a User Datagram Protocol (UDP)-based byte stream protocol. The UDP-based byte stream protocol comprises Quick UDP Internet Connection (QUIC).

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computer system 1100 may be transmitted to the computer system 1100 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A middlebox comprising:
   at least one processor; and
   a memory storing one or more executable instructions that, when executed by the least one processor, cause the at least one processor to:
   receive, from a server, a middlebox key that includes an indication of a lifetime of the middlebox key,
   receive, from a client device, one or more data packets including encrypted header data and a client device identifier,
   determine whether to permit a transmission of the one or more data packets to the server or prevent a transmission of the one or more data packets to the server based on the middlebox key and whether a match exists between the encrypted header data, after decryption, and the client device identifier,
   prevent the transmission of the one or more data packets to the server after:
      determining that the encrypted header data was encrypted using the middlebox key, and
      determining that the encrypted header data, after decryption, does not match the client device identifier; and
   permit the transmission of the one or more data packets to the server after:
      determining that the encrypted header data was encrypted using the middlebox key, and
      determining that the encrypted header data, after decryption, does match the client device identifier.

2. The middlebox of claim 1, wherein the one or more executable instructions, when executed by the at least one processor, further cause the at least one processor to prevent the transmission the one or more data packets to the server after:
   determining that the encrypted header data was not encrypted using the middlebox key; and
   determining that the one or more data packets are indicative of a distributed denial of service (DDOS) attack.

3. The middlebox of claim 1, wherein the one or more executable instructions, when executed by the at least one processor, further cause the at least one processor to permit the transmission of the one or more data packets to the server after:
   determining that the encrypted header data was not encrypted using the middlebox key; and
   determining that the one or more data packets are not indicative of a distributed denial of service (DDOS) attack.

4. The middlebox of claim 1, wherein the middlebox key is a first middlebox key herein the indication is a first indication of the lifetime of the first middlebox key, and wherein the one or more executable instructions, when executed by the at least one processor, further cause the at least one processor to:
   receive, from the server, a second middlebox key that includes a second indication of a lifetime of the second middlebox key before the lifetime of the first indication reaches an expiration time;
   determine whether to permit a transmission of the one or more data packets to the server or to prevent a transmission of the one or more data packets to the server based on the second middlebox key, the encrypted header data, and the client device identifier; and
   in response to determining whether to permit a transmission of the one or more data packets to the server or to prevent a transmission of the one or more data packets to the server:
      permit the transmission of the one or more data packets to the server during the lifetime of the second indication, or
      prevent the transmission of the one or more data packets to the server during the lifetime of the second indication.

5. The middlebox of claim 1, wherein the server and the middlebox communicate using at least one of a User Datagram Protocol (UDP)-based byte stream protocol or a Quick UDP Internet Connection (QUIC).

6. A method implemented by at least one processor of a middlebox, the method comprising:
   receiving, by the at least one processor and from a server, a middlebox key that includes an indication of a lifetime of the middlebox key;
   receiving, by the at least one processor and from a client device, one or more data packets including encrypted header data and a client device identifier;
   determining, by the at least one processor, whether to permit a transmission of the one or more data packets to the server or prevent a transmission of the one or more data packets to the server based on the middlebox key and whether a match exists between the encrypted header data, after decryption, and the client device identifier;
   preventing the transmission of the one or more data packets to the server after:
      determining that the encrypted header data was encrypted using the middlebox key, and
      determining that the encrypted header data, after decryption, does not match the client device identifier; and
   permitting the transmission of the one or more data packets to the server after:
      determining that the encrypted header data was encrypted using the middlebox key, and
      determining that the encrypted header data, after decryption, does match the client device identifier.

7. The method of claim 6, wherein method further comprises preventing, by the at least one processor, the transmission the one or more data packets to the server after:
  determining, by the at least one processor, that the encrypted header data was not encrypted using the middlebox key; and
  determining, by the at least one processor, that the one or more data packets are indicative of a distributed denial of service (DDOS) attack.

8. The method of claim 6, wherein the method further comprises permitting, by the at least one processor, the transmission of the one or more data packets to the server after:
  determining, by the at least one processor, that the encrypted header data was not encrypted using the middlebox key; and
  determining, by the at least one processor, that the one or more data packets are not indicative of a distributed denial of service (DDOS) attack.

9. The method of claim 6, wherein the middlebox key is a first middlebox key, wherein the indication is a first indication of the lifetime of the first middlebox key, and wherein the method further comprises:
  receiving, by the at least one processor and from the server, a second middlebox key that includes a second indication of a lifetime of the second middlebox key before the lifetime of the first indication reaches an expiration time;
  determining, by the at least one processor, whether to permit a transmission of the one or more data packets to the server or to prevent a transmission of the one or more data packets to the server based on the second middlebox key, the encrypted header data, and the client device identifier; and
  in response to determining whether permit a transmission of the one or more data packets to the server or to prevent a transmission of the one or more data packets to the server:
    permitting, by the at least one processor, the transmission of the one or more data packets to the server during the lifetime of the second indication, or
    preventing, by the at least one processor, the transmission of the one or more data packets to the server during the lifetime of the second indication.

10. The method of claim 6, wherein the encrypted header data includes a forensic key, and wherein the method further comprises retrieving, by the at least one processor, the forensic key from the encrypted header data after determining to prevent the transmission of the one or more data packets to the server.

11. The method of claim 6, wherein the server and the middlebox communicate using at least one of a User Datagram Protocol (UDP)-based byte stream protocol or a Quick UDP Internet Connection (QUIC).

12. A server comprising:
  at least one processor;
  a memory storing one or more executable instructions that, when executed by the least one processor, cause the at least one processor to:
    generate an encryption key, a forensic key, and a middlebox key, wherein the middlebox key includes an indication of a lifetime of the middlebox key,
    transmit the middlebox key including the indication of the lifetime to a middlebox,
    transmit the encryption key, the forensic key, the middlebox key, and the indication of the lifetime to a client device, and
    receive one or more data packets from the client device when the one or more data packets include encrypted header data and a client device identifier that is associated with the client device, wherein the encrypted header data is encrypted using the middlebox key, and wherein the encrypted header data, when decrypted, matches the client device identifier.

13. The server of claim 12, wherein the forensic key is used to determine an identity of the client device when at least one data packet of the one or more data packets received from the client device is indicative of a DDOS attack.

14. The server of claim 12, wherein the middlebox key is a first middlebox key, wherein the indication of the lifetime is a first indication of a first lifetime of the first middlebox key, and wherein the one or more executable instructions, when executed by the at least one processor, further cause the at least one processor to transmit, to the middlebox, a second middlebox key including a second indication of a second lifetime of the second middlebox key when the first lifetime nears an expiration time.

15. The server of claim 12, wherein the server and the middlebox communicate using at least one of a User Datagram Protocol (UDP)-based byte stream protocol or a Quick UDP Internet Connection (QUIC).

* * * * *